United States Patent
Buer et al.

(10) Patent No.: US 11,109,245 B2
(45) Date of Patent: Aug. 31, 2021

(54) DYNAMIC SIGNAL QUALITY CRITERIA FOR SATELLITE TERMINAL INSTALLATIONS

(71) Applicant: ViaSat, Inc., Carlsbad, CA (US)

(72) Inventors: Kenneth V. Buer, Gilbert, AZ (US); Clifford K. Burdick, Vista, CA (US); Ian A. Cleary, Tempe, AZ (US); Ramanamurthy V. Darapu, Gilbert, AZ (US); David H. Irvine, Carlsbad, CA (US); Philip A. Lampe, Encinitas, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 16/748,597

(22) Filed: Jan. 21, 2020

(65) Prior Publication Data

US 2020/0267575 A1    Aug. 20, 2020

Related U.S. Application Data

(60) Continuation of application No. 16/031,926, filed on Jul. 10, 2018, now Pat. No. 10,609,576, which is a
(Continued)

(51) Int. Cl.
*H04W 24/02*    (2009.01)
*H04B 7/185*    (2006.01)

(52) U.S. Cl.
CPC ........ *H04W 24/02* (2013.01); *H04B 7/18508* (2013.01)

(58) Field of Classification Search
CPC .... H01Q 1/084; H04B 7/18528; G01S 19/26; H04W 16/18; H04W 16/22; H04W 16/28;
(Continued)

(56) References Cited

U.S. PATENT DOCUMENTS 5,983,071 A    11/1999    Gagnon et al.
6,009,116 A    12/1999    Bednarek et al.
(Continued)

OTHER PUBLICATIONS

EchoStar Technologies Corporation, "Installation Instructions", 2006, 22 pages. (Year: 2006).*
(Continued)

*Primary Examiner* — Quoc Thai N Vu
(74) *Attorney, Agent, or Firm* — Holland & Hart LLP

(57) ABSTRACT

The described features generally relate to determining dynamic signal quality criteria for an installation of satellite terminals for communications in a satellite communications system. In particular, the signal quality criteria for an installation may be based on an identified position of the satellite terminal to be installed, and in some examples based on the positions and signal characteristics of neighboring satellite terminals that have already been installed. In some examples, a signal quality map may be generated for a service beam coverage area, based on predetermined transmission characteristics and/or measured transmissions from a number of satellite terminals served by a communications satellite. The generated signal quality map may then be used to determine a signal quality threshold for the installation of a satellite terminal being installed for communications in a satellite communications system.

25 Claims, 9 Drawing Sheets

Related U.S. Application Data division of application No. 15/055,180, filed on Feb. 26, 2016, now Pat. No. 10,034,183.

(58) Field of Classification Search
CPC . H04W 52/24; H04W 52/241; H04W 52/265; H04W 24/02; H04W 64/003; H04W 84/06; H04W 88/16
See application file for complete search history.

(56) References Cited

U.S. PATENT DOCUMENTS

| | | |
|---|---|---|
| 6,181,952 B1 | 1/2001 | Murata |
| 6,252,547 B1 | 6/2001 | Perry et al. |
| 7,592,953 B2 | 9/2009 | Morana |
| 7,667,643 B2 | 2/2010 | Handermann et al. |
| 7,671,797 B1 | 3/2010 | Herz et al. |
| 7,784,070 B2 | 8/2010 | Chang et al. |
| 8,112,779 B2 | 2/2012 | O'Donnell |
| 8,789,116 B2 | 7/2014 | Miller et al. |
| 8,995,415 B2 | 3/2015 | Yang et al. |
| 9,485,010 B1 | 11/2016 | Chen et al. |
| 2003/0008614 A1 | 1/2003 | Hanson et al. |
| 2003/0181162 A1 | 9/2003 | Matula |
| 2008/0158078 A1 | 7/2008 | Allen et al. |
| 2014/0051347 A1 | 2/2014 | Ling |
| 2016/0191913 A1 | 6/2016 | Martch et al. |

OTHER PUBLICATIONS

Automatic Satellite Systems, www.accessantennas.com.au, Aug. 3, 2015, Australia, 4 pgs.

Compact, Lightweight TV at sea, www.intelliantech.com/Sattv/i-Series/i2, Aug. 3, 2015, 5 pgs.

Satellite TV Antenna Systems, www.raymarine.com/, Aug. 3, 2015, 16 pgs.

Star Choice Dish High Definition Dish Size, www.usedottawa.com, 2 pgs.

TracVision TV6 Marine Satellite Television System, www.kvh.com/Leisure/Marine-Systems/Television/TV-series/TracVision-TV6.aspx, 2 pgs.

Your R.V. and Mobile Satellite Specialists, www.antennawizard.co/bell.html, 1 pg.

\* cited by examiner

DYNAMIC SIGNAL QUALITY CRITERIA FOR SATELLITE TERMINAL INSTALLATIONS

CROSS REFERENCES

The present Application is a Continuation of U.S. patent application Ser. No. 16/031,926 by BUER, et al., entitled "DYNAMIC SIGNAL QUALITY CRITERIA FOR SATELLITE TERMINAL INSTALLATIONS" filed Jul. 10, 2018, which is a divisional application of U.S. patent application Ser. No. 15/055,180 by BUER, et al., entitled "DYNAMIC SIGNAL QUALITY CRITERIA FOR SATELLITE TERMINAL INSTALLATIONS" filed Feb. 26, 2016, the entireties of each of which are incorporated herein by reference for all purposes.

BACKGROUND

In a satellite communications system, a communications satellite may provide service for a number of satellite terminals over a certain area. Signals transmitted between the satellite and each of the satellite terminals may have characteristics that depend on a location for each respective satellite terminal. For example, transmissions to or from satellite terminals located farther from the communications satellite may have lower signal strength and/or lower signal-to-noise ratio (SNR) than transmissions to or from satellite terminals located closer to the communications satellite. In another example, transmissions to or from a satellite terminal in an urban environment may have lower signal strength and/or lower SNR than transmissions to or from a satellite terminal in a rural environment, because the urban environment may have more scattering of signals or more sources of noise than the rural environment.

During an installation of a satellite terminal, a signal strength and/or SNR threshold may be measured to determine whether there has been a successful installation. If the installation is determined to be unsuccessful, adjustments may be made, such as adjusting an alignment of a satellite terminal antenna, or adjusting transmission power of a transmitting device. However, certain adjustments may be impractical, or result in an inefficient use of available radio frequency (RF) spectrum resources.

SUMMARY

The described features generally relate to determining dynamic signal quality criteria for an installation of satellite terminals for communications in a satellite communications system. In particular, the signal quality criteria for an installation may be based on an identified position of the satellite terminal to be installed, and in some examples based on the positions and signal characteristics of neighboring satellite terminals that have already been installed. In some examples, a signal quality map may be generated for a service beam coverage area, based on predetermined transmission characteristics and/or measured transmissions from a number of satellite terminals served by a communications satellite. The signal quality map may be generated by collecting signal quality information associated with each of the satellite terminals served by the communications satellite, and position information associated with each of the satellite terminals. The generated signal quality map may then be used to determine a signal quality threshold for the installation of another satellite terminal. Various devices of a satellite communications system may determine the dynamic signal quality criteria for the satellite terminal to be installed, such as the satellite terminal itself, a device in communications with the satellite terminal (e.g., a consumer premises equipment, an installation device, etc.), a gateway (e.g., a satellite access node) associated with the communications satellite, some other device in communications with the gateway (e.g., a satellite network device).

In some examples the satellite terminal may receive one or more positioning signals, from which the location of the satellite terminal may be determined. In some examples a single ranging signal may be received, where a location is determined, for example, from a determined distance from a transmitting device and an orientation between the transmitting device and the satellite terminal. In some examples a plurality of positioning signals may be received, and a location may be determined from a triangulation calculation. For example, a satellite terminal may be configured to receive a plurality of positioning signals from a global navigational satellite system (GNSS) constellation (e.g., a Global Positioning System (GPS) constellation, a Globalnaya Navigazionnaya Sputnikovaya Sistema (GLONASS) constellation, etc.) to determine the location of the satellite terminal. In other examples a location of the satellite terminal may be determined by a positioning signal receiver in another device at the premises of the satellite terminal, which may or may not be in communications with the satellite terminal, and may be a portable device such as an installation device or other portable GPS receiver. In other examples, the position of a satellite terminal may be otherwise approximated, such as a mailing address, ZIP code, ZIP+4, city, district, or other approximation. The determined position of the satellite terminal may then be used in the determination of a dynamic signal quality criteria for an installation procedure at the satellite terminal, and/or the determination of a signal quality map used in subsequent installations of other satellite terminals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
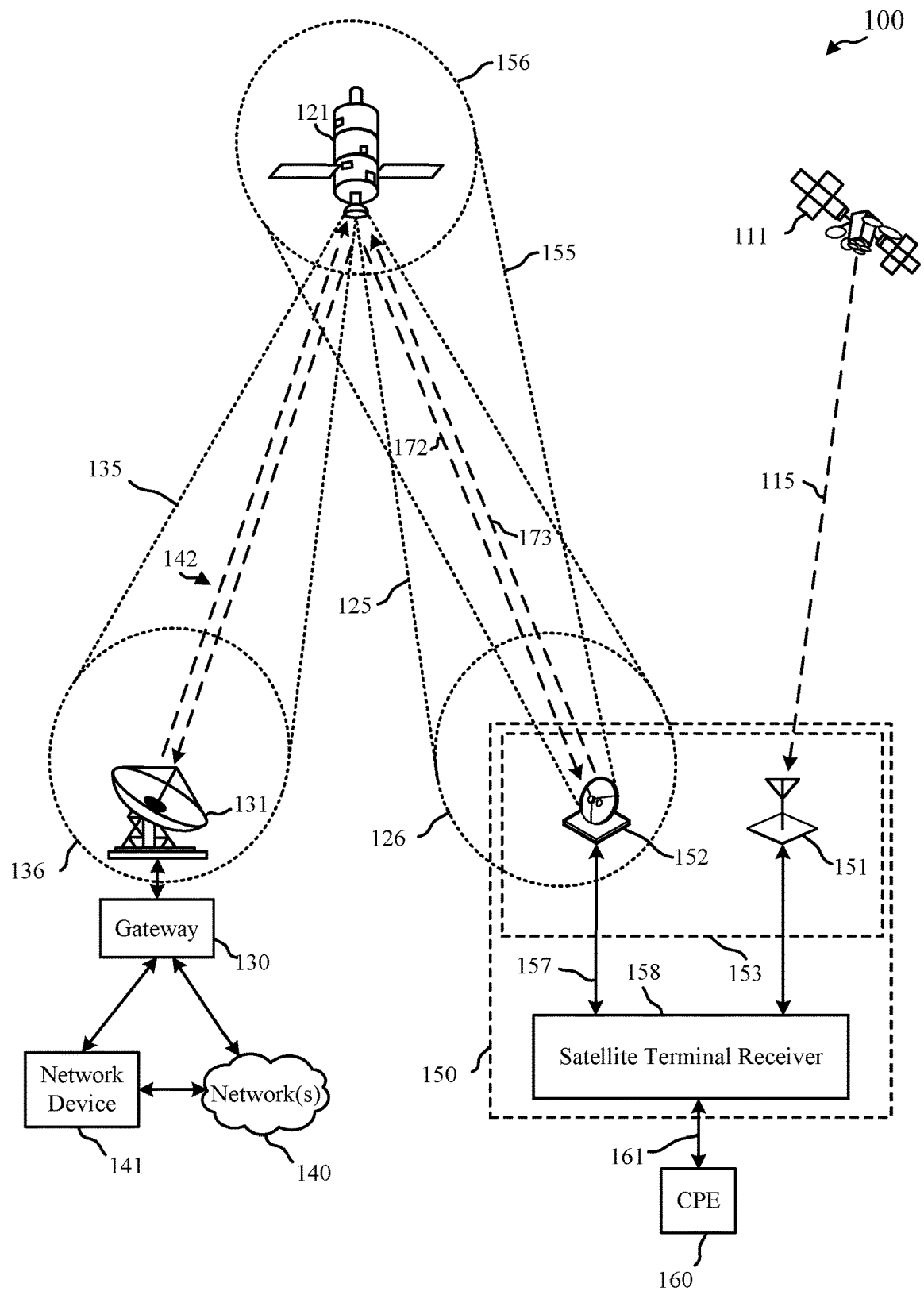
FIG. 1 shows a diagram of a satellite communication environment, in accordance with aspects of the present disclosure.

A satellite terminal may employ a communications antenna to establish a communications link between the satellite terminal and a communications satellite. The communications link may be configured for bi-directional communications (e.g., transmitting and receiving, etc.), or unidirectional communications (e.g., receiving), in some cases. An installation procedure may be used to establish initial communications between the satellite terminal and the communications satellite, where the installation procedure may include a pointing of an antenna of the satellite terminal and subsequently receiving an installation procedure transmission from the communications satellite, and/or sending an installation procedure transmission to the communications satellite. The success or failure of the installation procedure may be based at least in part on one or more installation procedure transmissions being received at a device (e.g., received at the satellite terminal, received at the communications satellite, forwarded by the communications satellite and received at an associated gateway, etc.), and measured to have a signal quality characteristic above a threshold value.

According to aspects of the present disclosure, a position may be identified for a satellite terminal, and the identified position may subsequently be used for determining a signal quality threshold. For example, an identified position may be used to determine that the satellite terminal is located near or at the edge of a service beam, which may be associated with a lower signal strength than near or at the center of the service beam. Thus, a lower signal quality threshold may be applied to the satellite terminal at the edge of the service beam than a signal quality threshold for a satellite terminal at the center of the service beam. The identified position may also be used to determine that the satellite terminal being installed is located near other satellite terminals, and a signal quality threshold may be based on signal characteristics associated with the other satellite terminals. For example, the satellite terminal to be installed may be located in an urban environment and/or be near a source of interference, such that the effects of the urban environment and/or source of interference may be reflected in signals sent and/or received by the other satellite terminals. Thus, a signal quality threshold may be determined based at least in part on the proximity of the satellite terminal to be installed to other satellite terminals that have signal characteristics affected by their environment. In some examples the determination may be based on a signal quality map generated at least in part on the positions of the other satellite terminals and respective signal quality characteristics (e.g., signal strength, signal-to-noise ratio (SNR), etc.).

The position of a satellite terminal to be installed may be identified using various techniques. For example, the satellite terminal may be configured with an auxiliary antenna configured to receive positioning signals, such as positioning signals from a GNSS satellite constellation (e.g., Global Positioning System (GPS), Globalnaya Navigazionnaya Sputnikovaya Sistema (GLONASS), etc.). The auxiliary antenna may be located in the proximity of the satellite terminal, and in some examples the antennas may be co-located within a satellite terminal antenna assembly. In other examples a position of the satellite terminal may be determined by a positioning signal receiver in another device at the premises of the satellite terminal, which may or may not be in communications with the satellite terminal, and may be a portable device such as an installation device or other portable GPS receiver. In other examples, the position of a satellite terminal may be otherwise approximated, such as a mailing address, ZIP code, ZIP+4, city, district, or other approximation. The determined position of the satellite terminal may be used by the same device that determined the position to subsequently determine a signal quality threshold, or may be provided to another device that determines the signal quality threshold.

This description provides examples, and is not intended to limit the scope, applicability or configuration of embodiments of the principles described herein. Rather, the following description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communications environment 100, in accordance with aspects of the present disclosure. The satellite communications environment 100 includes a satellite communications system, which includes a communications satellite 121, a satellite terminal 150, one or more consumer premises equipments (CPEs) 160, a gateway 130, and one or more network devices 141. As shown in the example of FIG. 1, the satellite communications environment 100 also includes an auxiliary satellite system including one or more auxiliary satellites 111.

The one or more communications satellites 121 in the satellite communications system may include any suitable type of communication satellite configured for wireless communication with the gateway 130 and one or more satellite terminals 150. In some examples, some or all of the communications satellites 121 may be in geostationary orbits, such that their positions with respect to terrestrial devices may be relatively fixed, or fixed within an operational tolerance or other orbital window. In other examples, any appropriate orbit (e.g., low Earth orbit (LEO), medium Earth orbit (MEO), etc.) for one or more satellite(s) 121 of the satellite communications system may be used.

The satellite terminal 150 may include a satellite terminal communications antenna 152 configured for receiving forward link signals 172 from a communications satellite 121. The satellite terminal communications antenna 152 may also be configured to transmit return link signals 173 to a communications satellite 121. Thus, the satellite terminal 150 may be configured for uni-directional or bi-directional communications with one or more communications satellites 121 the satellite communications system. In some examples the satellite terminal communications antenna 152 may be directional. For example, the satellite terminal communications antenna 152 may have a peak gain along a primary axis (e.g., an antenna boresight). In some examples, the peak gain may roll off steeply in off-axis directions. A steep roll-off in antenna gain may be referred to as a narrow field of view of an antenna. In some examples the satellite terminal communications antenna 152 may be configured with a narrow field of view by way of a fixed configuration of focusing and/or reflecting elements such as an antenna having a parabolic dish reflector. In some examples the satellite terminal communications antenna 152 may be configured with a narrow field of view by way of beamforming, where the field of view may be electronically configurable at an array of antenna elements to aim signal transmission and/or reception along a desired direction.

The communications satellite 121 may communicate via a service beam 125 directed towards a service beam coverage area 126 that includes the satellite terminal 150. The service beam coverage area 126 may cover any suitable service area (e.g., circular, elliptical, hexagonal, local, regional, national, etc.) and provide service to any number of satellite terminals 150 located in the service beam coverage area 126. In some examples the communications satellite 121 may be a multi-beam satellite and may have multiple service beams, including service beam 125, covering multiple service beam coverage areas, including service beam coverage area 126, which may or may not overlap with adjacent service beam coverage areas.

The communications satellite 121 may transmit a forward link signal 172 via the service beam 125 to be received by the satellite terminal 150. The satellite terminal 150 may receive the forward link signal 172 using a satellite terminal communications antenna 152. To establish a suitable communications link for forward link signals 172 between the satellite terminal 150 and the communications satellite, the forward link signal 172 may be received at the satellite terminal 150 with a signal strength or a signal-to-noise ratio (SNR) above a threshold, which may depend on the transmission power of the communications satellite 121, the alignment and position of the satellite terminal communications antenna 152, and the attenuation environment around the satellite terminal communications antenna 152 (e.g., the attenuation environment between the satellite terminal 150 and the communications satellite 121). The communications satellite 121 may communicate with the gateway 130 by sending and/or receiving signals 142 through one or more gateway beams 135, each of which may be associated with a respective gateway beam coverage area 136. Gateway beams 135 may, for example, carry communications traffic for one or more satellite terminals 150 (e.g., relayed by the communications satellite 121), or other communications between the communications satellite 121 and the gateway 130.

The satellite terminal communications antenna 152 may transmit a return link signal 173 to the communications satellite 121 via a satellite terminal beam 155. To establish a suitable communications link for return link signals 173 between the satellite terminal 150 and the communications satellite, the return link signals 173 may be received at the communications satellite 121 with a signal strength and/or SNR above a threshold, which may again depend on the transmission power of the satellite terminal 150, the alignment and position of the satellite terminal communications antenna 152, and the attenuation environment around the satellite terminal communications antenna 152 (e.g., the attenuation environment between the satellite terminal 150 and the communications satellite 121). For example, the satellite terminal communications antenna 152 may be considered to be properly aligned with a target (e.g., communications satellite 121) when a transmitted signal of the satellite terminal communications antenna 152 has sufficient antenna gain in the direction of the target to permit signal communication having desired performance characteristics. Such a condition may occur when a beam spot 156 of the satellite terminal beam is aligned with the communications satellite 121.

The satellite communications system may operate in one or more frequency bands. For example, the satellite communications system may operate in the International Telecommunications Union (ITU) Ku, K, or Ka-bands, C-band, X-band, S-band, L-band, and the like. Additionally, the satellite terminal communications antenna 152 may be used in other applications besides ground-based stationary systems, including mobile applications such as boats, aircraft, ground-based vehicles, and the like.

The gateway 130 may send and receive signals 142 to and from communications satellites 121 of the satellite communications system using the gateway antenna system 131. The gateway antenna system 131 may be two-way capable and designed with adequate transmit power and receive sensitivity to communicate reliably with at least one communications satellite 121 from the satellite communications system. The gateway 130 may also communicate with one or more networks 140. The networks 140 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and/or the like. A network device 141 may be coupled with the gateway 130 and may control aspects of the satellite communications system. In various examples a network device may be co-located or otherwise nearby the gateway 130, or may be a remote installation that communicates with the gateway 130 and/or network(s) 140 via wired and/or wireless communications link(s).

The satellite terminal communications antenna 152 may be part of a satellite terminal antenna assembly 153, which may also include various hardware for mounting the satellite terminal antennas. A satellite terminal antenna assembly 153 may also include circuits and/or processors for converting (e.g., performing frequency conversion, modulating/demodulating, multiplexing/demultiplexing, filtering, forwarding, etc.) between radio frequency (RF) satellite communication signals (e.g., forward link signals 172 and/or return link signals 173), and satellite terminal communications signals 157 transmitted between the satellite terminal communications antenna 152 and a satellite terminal receiver 158. Such circuits and/or processors may be included in an antenna communication assembly, which may also be referred to as a transmit and receive integrated assembly (TRIA). Additionally or alternatively, the satellite terminal receiver 158 may include circuits and/or processors for performing various radio frequency (RF) signal operations (e.g., receiving, performing frequency conversion, modulating/demodulating, multiplexing/demultiplexing, etc.). The satellite terminal antenna assembly 153 may also be known as a satellite outdoor unit (ODU), and the satellite terminal receiver 158 may be known as a satellite indoor unit (IDU).

The satellite terminal 150 may be connected via a wired or wireless connection 161 to one or more consumer premises equipment (CPE) 160 and may provide network access service (e.g., Internet access, etc.) or other communication services (e.g., broadcast media, etc.) to CPEs 160 via the satellite communications system. The CPE(s) 160 may include user devices such as, but not limited to, mobile phones, personal digital assistants (PDAs), other handheld devices, netbooks, notebook computers, tablet computers, laptops, display devices (e.g., TVs, computer monitors, etc.), printers, and the like. The CPE(s) 160 may also include any equipment located at a premises of a subscriber, including routers, firewalls, switches, private branch exchanges (PBXs), Voice over Internet Protocol (VoIP) gateways, and the like. In some examples, the CPE(s) 160 may include an installation device (e.g., a hand-held installation device, a laptop computer, etc.) configured to perform various procedures for establishing, maintaining, and/or troubleshooting a communications link between the communications satellite 121 and the satellite terminal 150, such as installation procedures employing dynamic signal quality thresholds as further described herein. In some examples, the satellite terminal 150 provides for two-way communications between the CPE 160 and network(s) 140 via the communications satellite 121 and the gateway 130.

The satellite terminal 150 may also include a satellite terminal auxiliary antenna 151. Although the satellite terminal auxiliary antenna 151 may be a separately installed component, the satellite terminal auxiliary antenna 151 may be co-located with the satellite terminal communications antenna in the satellite terminal antenna assembly 153 in some cases. In this manner, the satellite terminal auxiliary antenna 151 may have a known position and/or orientation relative to the satellite terminal communications antenna 152. In various examples, the satellite terminal auxiliary antenna 151 may include or be coupled with circuits and/or processors for receiving, converting, and/or decoding positioning signals 115 received by the satellite terminal auxiliary antenna 151.

In some examples the satellite terminal auxiliary antenna 151 may be an antenna configured to receive positioning signals 115 transmitted by one or more auxiliary satellites 111 of an auxiliary satellite system. For example, the satellite terminal auxiliary antenna 151 may be configured to receive positioning signals 115 from a global navigation satellite system (GNSS) (e.g., GPS, GLONASS, etc.). Additionally or alternatively, the satellite terminal auxiliary antenna 151 may be configured to receive positioning signals 115 from another system, such as a land-based positioning system, or another system not specifically configured for positioning purposes, but nonetheless transmitting signals that may be used to determine the position of a receiving device. Thus, in some examples the satellite terminal 150 or a connected device (e.g., a CPE 160, a gateway 130, or a network device 141) may be able to determine an installation position of the satellite terminal 150 based on information in various types of received positioning signals 115. In other examples, the position of the satellite terminal 150 may be determined by another device, such as a CPE 160. For example, a CPE may include an auxiliary antenna configured to receive positioning signals, such as positioning signals 115 from an auxiliary satellite system. In an example, CPE 160 may be a laptop or other installation device with a GPS antenna configured to identify the position of the satellite terminal 150 prior to an installation procedure. In various examples, a satellite terminal 150 and/or a CPE 160 may be configured to provide information corresponding to the position of the satellite terminal 150 to another device of the satellite communications system, such as the communications satellite 121, the gateway 130, and/or a network device 141.

Although examples of a satellite terminal communications antenna 152 described herein use a two-way satellite communications system for illustrative purposes, the techniques described herein are not so limited. For example, the hardware and techniques described herein could be used on antennas for point-to-point terrestrial links and in some examples may not be limited to two-way communication. In other examples, the hardware and techniques may be used for an initial installation in a receive-only implementation, such as to receive broadcast media.

Figure 2:
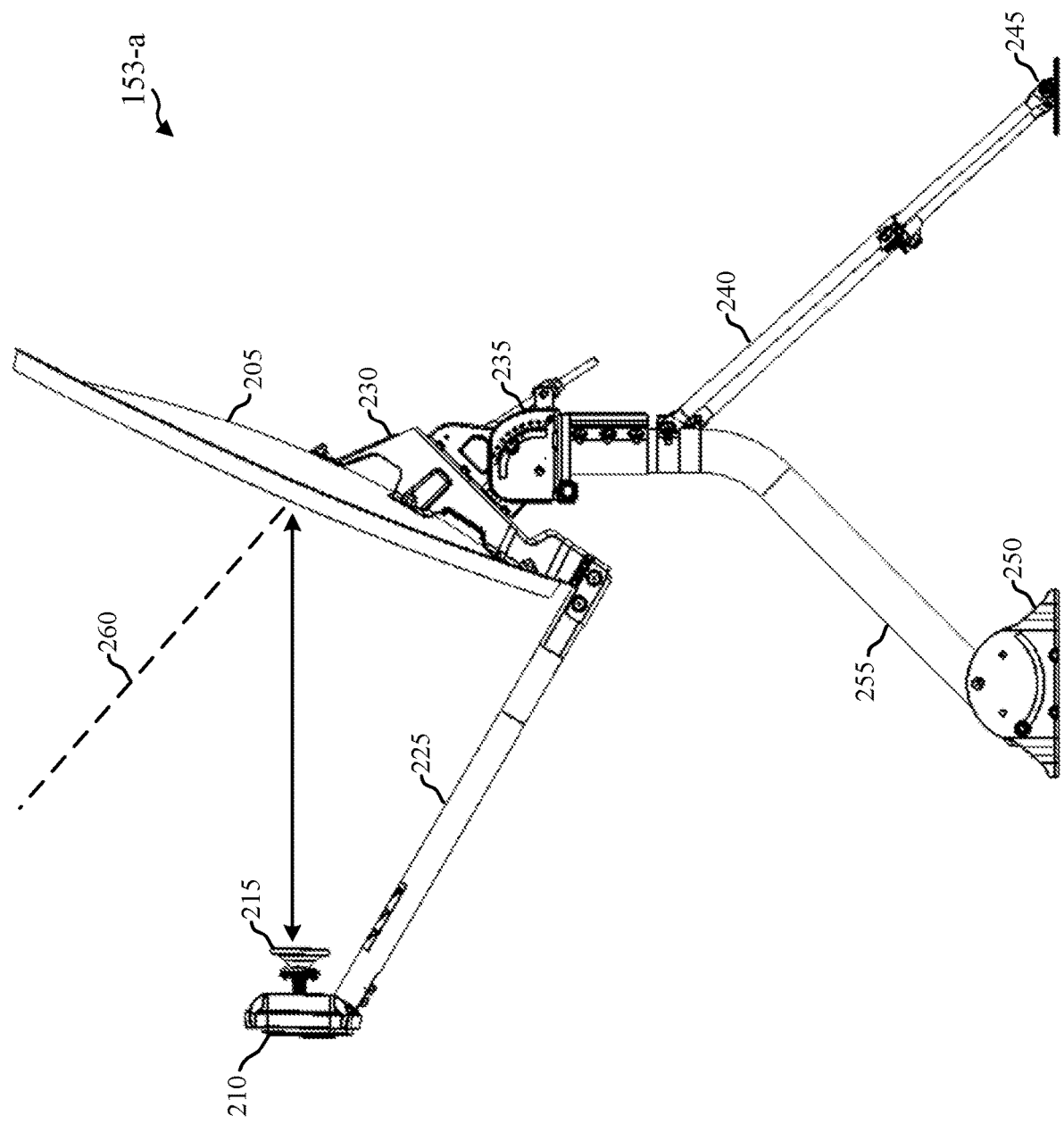
FIG. 2 shows a diagram of an example satellite terminal antenna assembly, in accordance with aspects of the present disclosure.

FIG. 2 shows a diagram of an example satellite terminal antenna assembly 153-a, in accordance with aspects of the present disclosure. The satellite terminal antenna assembly 153-a may be an example of aspects of the satellite terminal antenna assembly 153 of satellite terminal 150 described with reference to FIG. 1. The satellite terminal antenna assembly 153-a includes an antenna communication assembly 210, which houses a satellite terminal communications antenna and a satellite terminal auxiliary antenna, and a mounting structure. The satellite terminal communications antenna may be an example of satellite terminal communications antenna 152 described with reference to FIG. 1. The satellite terminal auxiliary antenna may be an example of satellite terminal auxiliary antenna 151 described with reference to FIG. 1.

The satellite terminal antenna assembly 153-a includes a reflector 205 mounted to a mast 255 via a mounting bracket assembly 235. On the other end, the mast 255 may attach to a mounting surface via a foot 250. The foot 250 may be, for example, a mounting bracket that can be used to affix the mast 255 to a structure. In some examples, the mast 255 is also supported by legs 240 that provide further attachment and stability using mounting brackets 245 to attach to the structure. One or more of the foot 250 and the mounting brackets 245 may function as an adjustable mounting device. The mast 255 may be installed and adjusted (e.g., using adjustments on legs 240) such that the top portion is plumb (e.g., perpendicular to the horizon within tolerances as measurable by an installer), allowing the elevation and azimuth of the reflector 205 to be adjusted (e.g., adjusted independently) via the mounting bracket assembly 235. The installer may then position the reflector 205 to the proper azimuth, elevation, and skew. The mounting bracket assembly 235 can include azimuth, elevation, and skew adjustments of the reflector 205 relative to the mast 255. Elevation refers to the angle between the satellite terminal antenna assembly 153-a and the horizon, which may be measured with reference to the satellite terminal communications antenna boresight 260. Azimuth refers to the angle between the satellite terminal communications antenna boresight 260 and a direction of true north in a horizontal plane. Skew refers to the angle of rotation about the satellite terminal communications antenna boresight 260.

The satellite terminal communications antenna boresight 260 may generally illustrate a principal axis (e.g., direction of maximum gain, etc.) of the satellite terminal antenna assembly 153-a that, during installation, may be aligned along a direction between the satellite terminal antenna assembly 153-a and a communications satellite 121. By aligning the satellite terminal communications antenna boresight 260 in this manner, the satellite terminal communications antenna 152-a may have an optimal gain and/or sensitivity with respect to communications with a communications satellite 121.

The satellite terminal antenna assembly 153-a may, for example, be initially pointed coarsely by an installer such that the satellite terminal communications antenna boresight 260 is pointed in the general direction of a communications satellite 121. The initial azimuth, elevation, and skew angles for pointing the satellite terminal antenna assembly 153-a may be determined by the installer based on the known position of the satellite and the known geographic position where the satellite terminal antenna assembly 153-a is being installed. In some examples the initial azimuth, elevation, and skew angles may be determined based the position as determined by positioning signals received at the satellite terminal antenna assembly 153-a. Once the satellite terminal antenna assembly 153-a is coarsely positioned and/or oriented in the general direction of the communications satellite 121, the elevation and/or azimuth angles can be further adjusted by the installer to fine tune the pointing until the satellite terminal communications antenna boresight 260 is sufficiently pointed at the communications satellite 121. A measurement device, such as a power meter, may be used to directly measure the signal strength of the received forward link signal 172. Additionally or alternatively, a measurement device may be used to measure some other metric indicating the signal strength of the received forward link signal 172. The measurement device may for example be an external device that the installer temporarily attaches to the electrical feed. As another example, the measurement device may be integrated into the transceiver (e.g., integrated into the antenna communication assembly 210), or some other portion of a satellite terminal 150. The measurement device may for example produce audible tones indicating signal strength to assist the installer in pointing the satellite terminal antenna assembly 153-a.

The installer may iteratively adjust the elevation and/or azimuth angle of the satellite terminal antenna assembly 153-a until the received signal strength, as measured by the measurement device, reaches a predetermined value (e.g., a dynamic signal quality threshold determined by one of the devices of a satellite communications system). In some examples, the installer adjusts the position and/or orientation of the satellite terminal antenna assembly 153-a until the received signal strength is maximized. In other words, the installer attempts to position the satellite terminal antenna assembly 153-a such that the satellite terminal communications antenna boresight 260 is pointed directly at the communications satellite 121. Once the satellite terminal antenna assembly 153-a is sufficiently aligned, the installer can immobilize the mounting bracket assembly 235 to preclude further movement of the satellite terminal antenna assembly 153-a.

An antenna communication assembly 210 is attached to the reflector 205 via an arm 225 and a skew plate 230. The antenna communication assembly 210 may include circuits and/or processors to process RF signals transmitted by and/or received at the satellite terminal antenna assembly 153-a. In some examples, the antenna communication assembly 210 may be a transmit and receive integrated assembly (TRIA), which may be coupled with a satellite IDU (e.g., a satellite terminal receiver 158 as described with reference to FIG. 1) for a satellite terminal (e.g., a satellite terminal 150 as described with reference to FIG. 1, etc.) via an electrical feed (not shown).

The antenna communication assembly 210 includes a feed horn 215 and a transceiver associated with communication signals transmitted between the satellite terminal communications antenna 152-a and a communication satellite (e.g., a communications satellite 121 of the satellite communications system). The antenna communication assembly 210 may include various circuits and/or processors to support satellite communications, where such components may be assembled into a housing with the feed horn 215 opening towards the reflector 205. Electromagnetic signals of a communications satellite 121, such as forward link signals 172 and/or return link signals 173 described with reference to FIG. 1, may be transmitted by and received at the antenna communication assembly 210 via downlink and uplink beams.

Although shown as having a satellite terminal communications antenna boresight 260 that is incident on the reflector 205 (e.g., reflecting into the feed horn 215), some examples of a satellite terminal antenna assembly 153-a may not include a reflector 205. In such examples, the satellite terminal communications antenna boresight 260 may be incident on an antenna communication assembly 210 (e.g., directed into the feed horn 215). In some examples, whether a satellite terminal communications assembly includes a reflector 205 or lacks a reflector 205, the satellite terminal communications antenna boresight 260 may not have a fixed orientation, and instead may be electronically configurable by way of various beamforming techniques.

The satellite terminal antenna assembly 153-a also includes a satellite terminal auxiliary antenna, which may be an example of the satellite terminal auxiliary antenna 151 described with reference to FIG. 1. As illustrated, the components of the satellite terminal auxiliary antenna may be integrated into the antenna communication assembly 210, and may be configured to receive one or more positioning signals 115. For example, the satellite terminal auxiliary antenna may be a GNSS receiver (e.g., a GPS receiver or a GLONASS receiver) incorporating antenna elements and associated receiver and/or processing circuits in a circuit assembly that may be co-located or otherwise coupled with other circuits of the antenna communication assembly. In various examples the satellite terminal auxiliary antenna, the antenna communication assembly 210, or some other portion of a satellite terminal 150 may include processing circuits to associate received positioning signals 115 with the respective position of the transmitting device, such as an auxiliary satellite 111. In examples where positioning signals 115 are received from an auxiliary satellite 111, such an association may include decoding ephemeris data from the received positioning signals 115. In some examples the satellite terminal auxiliary antenna, the antenna communication assembly 210, or some other portion of a satellite terminal 150 may include processing circuits for determining a position of the satellite terminal antenna assembly 153-a based at least in part on the received positioning signals 115.

In other examples, a satellite terminal antenna assembly 153 may have a different mounting structure than that shown, such as, for example, a mounting structure suitable to mount on a pole. In examples where a satellite terminal antenna assembly 153 is mounted on a moving object (e.g., a vehicle, aircraft, boat, etc.), or the target communications satellite is moving (e.g., LEO orbit, etc.) the satellite terminal antenna assembly 153 may include one or more mechanical alignment elements (e.g., gimbal, etc.) to realign the satellite terminal antenna assembly 153 to track a communications satellite 121. These alignment elements may be automatically controlled to realign the satellite terminal antenna assembly 153 as the object and/or a communications satellite 121 move relative to each other.

Figure 3:
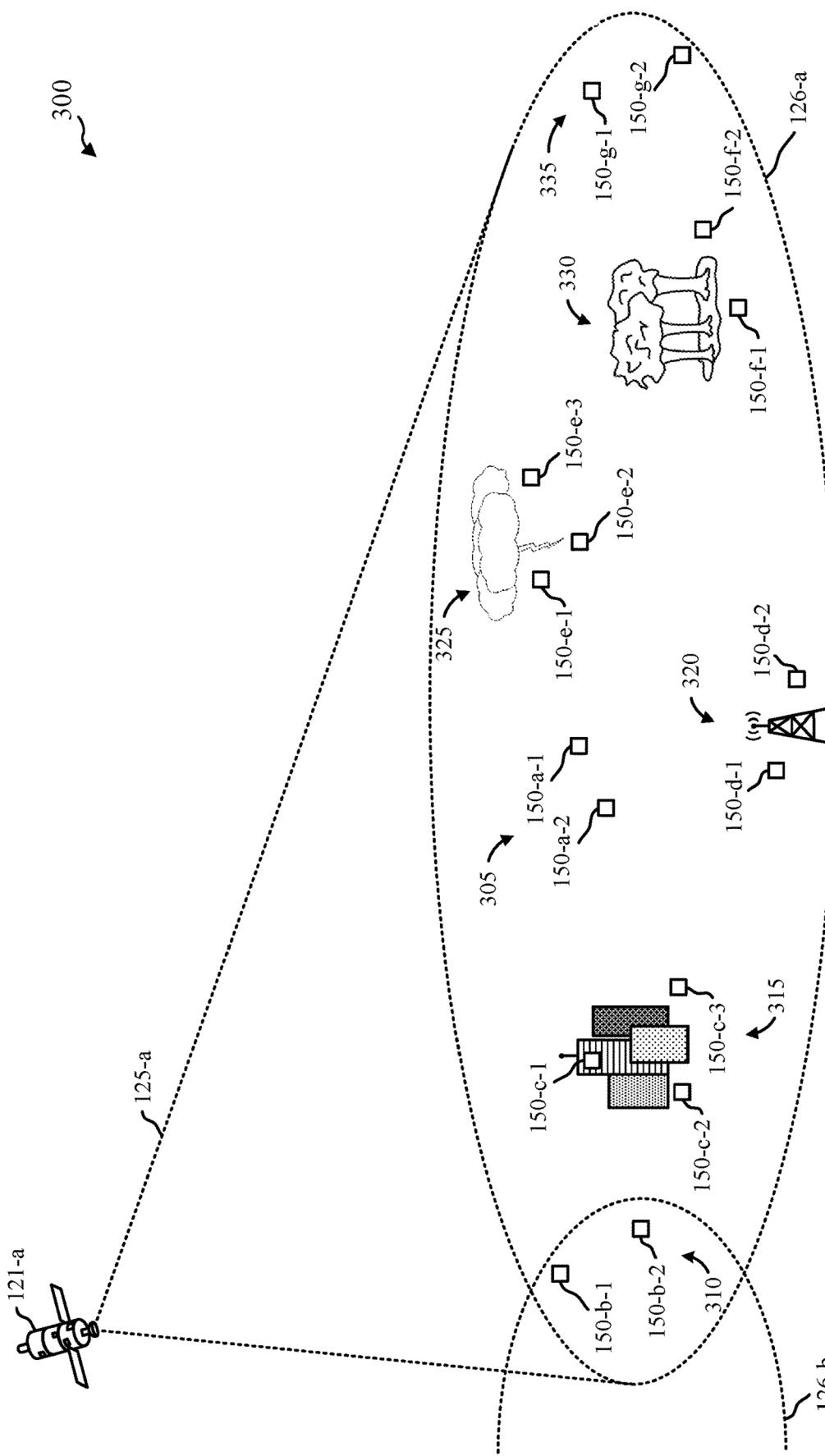
FIG. 3 is an illustration of a satellite communications system having a plurality of satellite terminals in various positions within a service beam coverage area of a communications satellite, in accordance with aspects of the present.

FIG. 3 is an illustration 300 of a satellite communications system having a plurality of satellite terminals 150 in various positions within a service beam coverage area 126-*a* of a communications satellite 121-*a*, in accordance with aspects of the present disclosure. The satellite terminals 150 may be located at respective positions that may experience various effects on signal quality associated with transmissions between the communications satellite 121-*a* and each respective satellite terminal 150.

In some examples, a service beam 125 of a satellite (e.g., service beam 125-*a*) may have a center portion that is associated with higher transmission signal quality, and an outer portion that is associated with lower signal quality. This may be a result of, for example, signal deterioration and/or drop-off in areas of the service beam 125 that are farther from the alignment of an antenna boresight (e.g., farther from a boresight of an antenna of the communications satellite 121-*a*). Such deterioration may affect signal quality of transmissions (e.g., forward link signals 172 and/or return link signals 173) between the communications satellite 121-*a* and various satellite terminals 150 being served by the communications satellite 121-*a*.

In some examples, the degradation of signal quality of transmissions between the communications satellite 121-*a* and the satellite terminals 150 may be related to the position of respective satellite terminals 150 within a service beam coverage area 126 (e.g., service beam coverage area 126-*a* of the service beam 125-*a*). For example, as shown in the illustration 300, satellite terminals 150-*a*-1 and 150-*a*-2 are located in region 305 at a central portion of the service beam coverage area 126-*a*. Transmissions between the communications satellite 121-*a* and the satellite terminals 150-*a* may be associated with relatively high signal quality (e.g., high signal strength, high SNR, etc.). As shown in the illustration 300, satellite terminals 150-*b*-1, 150-*b*-2, 150-*f*-1, and 150-*f*-2 are located in an outer portion (e.g., regions 310 and 335, respectively) of the service beam coverage area 126-*a*. Transmissions between the communications satellite 121-*a* and the satellite terminals 150-*b* or 150-*f* may be associated with relatively low signal quality (e.g., low signal strength, low SNR, etc.).

In various examples, a signal quality threshold may be determined for the installation of a satellite terminal 150 in the service beam coverage area 126-*a* based on the position of the satellite terminal within the service beam coverage area. For example, a satellite terminal 150 that is to be installed for communications with the communications satellite 121-*a* may have its position identified (e.g., by positioning signals received by the satellite terminal 150, by positioning signals received by another device at the installation position such as a CPE 160 or another installation device, by providing the installation position by way of address, ZIP code, etc.). The identified position may then be used by various components to determine a signal quality threshold for determining the success or failure of an installation procedure. For example, the identified position may be entered into a mathematical formula that determines the signal quality threshold based on the identified position, and any other relevant variables (e.g., a baseline signal quality threshold, a position of the communications satellite 121-*a*, a transmission strength of the communications satellite 121-*a*, position of a boundary of the service beam coverage area 126-*a*, an orientation of a boresight of an antenna at the communications satellite 121-*a*, an antenna gain of a satellite terminal communications antenna 152, etc.).

In some examples the identified position of a satellite terminal to be installed may be used to identify a signal quality threshold from a signal quality map, where the signal quality map may be based on predetermined characteristics and/or measured transmissions between the communications satellite 121-*a* and one or more already-installed satellite terminals 150. In some examples a signal quality map may be a planar map that represents signal quality as a function of positional variables such as latitude and longitude. In other examples a signal quality map may be a polar map that represents signal quality as a function of principal angles from the perspective of the communications satellite 121-*a*. For example, a polar map may have an origin centered along a satellite antenna boresight, and may associate a signal quality threshold based on a conversion of the identified position of the satellite terminal 150 to be installed into angles in two orthogonal directions. Thus, an identified position of a satellite terminal 150 to be installed for communications with the communications satellite 121-*a* may be used in various ways to look up or otherwise determine a signal quality threshold for an installation procedure based on a signal quality map.

As shown in the illustration 300, satellite terminals 150 may be located in areas that further affect signal quality of transmissions between the communications satellite 121-*a* and a satellite terminal 150. These associated affects may be identified, or otherwise accounted for in determining a signal quality map and/or determining a signal quality threshold for determining the success or failure of an installation procedure.

For example, satellite terminals 150-*b*-1 and 150-*b*-2 may be located in a region 310 of the service beam coverage area 126-*a* that overlaps with a second service beam coverage area 126-*b*. The second service beam coverage area 126-*b* may be associated with a different beam of the communications satellite 121-*a*, or may be associated with a different satellite that may or may not be associated with communications signals. In some examples, transmissions of the second service beam coverage area 126-*b* may cause interference (e.g., transmissions in a coincident or overlapping RF spectrum band, other constructive or destructive RF interference, etc.) to the satellite terminals 150-*b*, and therefore may reduce a SNR associated with the satellite terminals 150-*b*. Therefore, the interference associated with region 310 of the service beam coverage area 126 may reduce the signal quality of transmissions between the communications satellite 121-*a* and the satellite terminals 150-*b* compared to those satellite terminals 150 that are not in the region 310.

In another example, satellite terminals 150-*c*-1, 150-*c*-2, and 150-*c*-3 may be located in a region 315 of the service beam coverage area 126-*a* that is characterized by an urban environment. For example, the region 315 may have tall and/or densely packed buildings that may attenuate, reflect, and/or scatter transmissions between the communications satellite 121-*a* and the satellite terminals 150-*c* in a manner that reduces signal strength of received transmissions. In some examples, a satellite terminal 150-c may installed inside a building (e.g., satellite terminal 150-c-1), which may further attenuate signals due to the relatively lower permittivity of building materials than the permittivity of free space. The region 315 may additionally have other sources of interference that generate noise at the communications satellite 121-a and/or the satellite terminals 150-c. Therefore, the attenuation, reflections, scattering, and/or interference associated with region 315 of the service beam coverage area 126-a may reduce the signal quality of transmissions between the communications satellite 121-a and the satellite terminals 150-b compared to those satellite terminals 150 that are not in the region 315.

In another example, satellite terminals 150-d-1 and 150-d-2 may be located in a region 320 of the service beam coverage area 126-a that includes a ground-based interferer such as an antenna tower. In some examples, transmissions of the ground-based interferer may cause interference (e.g., transmissions in a coincident or overlapping RF spectrum band, other constructive or destructive RF interference, etc.) received at the satellite terminals 150-d and/or the communications satellite 121-a, and therefore may reduce a SNR associated with transmissions between the communications satellite 121-a and the satellite terminals 150-d. Therefore, the interference associated with the ground-based interferer of region 320 of the service beam coverage area 126-a may reduce the signal quality of transmissions between the communications satellite 121-a and the satellite terminals 150-d compared to those satellite terminals 150 that are not in the region 320.

In another example, satellite terminals 150-e-1, 150-e-2, and 150-e-3 may be located in a region 325 of the service beam coverage area 126-a that is experiencing various meteorological conditions. For example, the region 325 may be experiencing cloudy, rainy, and or snowy conditions that may attenuate, reflect, and/or scatter transmissions between the communications satellite 121-a and the satellite terminals 150-a in a manner that reduces signal strength of received transmissions. The meteorological conditions of region 325 may additionally have sources of interference such as lightning, atmospheric pressure discharges, or other phenomenon generating electromagnetic noise that is received at the communications satellite 121-a and/or the satellite terminals 150-e. Therefore, the attenuation, reflections, scattering, and/or interference associated with region 325 of the service beam coverage area 126-a may reduce the signal quality of transmissions between the communications satellite 121-a and the satellite terminals 150-e compared to those satellite terminals 150 that are not in the region 325. In the example of region 325, the reduction of signal quality may increase or decrease over time, and/or may move to different portions of the service beam coverage area 126-a. Thus, the effects to signal quality of region 325 may be transient in nature.

In another example, satellite terminals 1504-1 and 150-f-2 may be located in a region 330 of the service beam coverage area 126-a characterized by dense vegetation, such as a forest. The dense vegetation of region 325 may cause attenuation, reflections, and/or scattering of transmissions between the communications satellite 121-a and the satellite terminals 150-a in a manner that reduces signal strength of received transmissions. Therefore, the attenuation, reflections, and/or scattering associated with region 330 of the service beam coverage area 126-a may reduce the signal quality of transmissions between the communications satellite 121-a and the satellite terminals 150-f compared to those satellite terminals 150 that are not in the region 330.

In the example of region 330, the reduction of signal quality may increase over time due to vegetation growth, and/or may decrease over time due to removal of vegetation, seasonal loss of vegetation, fires, or death and decay of vegetation. Thus, like the effects on signal quality associated with region 325, the effects to signal quality of region 330 may also be transient in nature. However, the effects may change over a longer time interval, and in some cases may be semi-static.

In another example, satellite terminals 150-g-1 and 150-g-2 may be located in a region 335 of the service beam coverage area 126-a characterized by being at a relatively far distance from the communications satellite 121-a. The greater distance to the communications satellite 121-a may cause greater attenuation of transmissions between the communications satellite 121-a and the satellite terminals 150-g. Therefore, the attenuation associated with region 335 of the service beam coverage area 126-a may reduce the signal quality of transmissions between the communications satellite 121-a and the satellite terminals 150-g compared to those satellite terminals 150 that are not in the region 335.

The effects on signal quality associated with regions of a service beam coverage area 126 may be used in the determination of signal quality criteria used to determine whether an installation of a satellite terminal 150 was successful. For example, a device of a satellite communications system (e.g., a gateway 130, a network device 141, a communications satellite 121, a satellite terminal 150, a CPE 160, etc.) may collect information associating measured signal quality characteristics of transmissions between a communications satellite 121 and a number of installed satellite terminals 150 with positions of the respective satellite terminals 150. In some examples, the collected information may indicate effects on signal quality associated with an overlapping service beam coverage area, an urban environment, a ground-based interferer, a meteorological condition, vegetation, and/or distance from a serving communications satellite 121, and information regarding the indicated effects on signal quality may be stored in various devices of a satellite communications system (e.g., locations of degraded signal quality, amount of degradation to signal quality, etc.). In various examples, portions of the signal quality effects indicated by the collected information may be further characterized by a time constant or other decay factor, and/or annual or seasonal adjustments, such as those signal quality effects associated with meteorological conditions and/or vegetation. In some examples, the collected information may be adjusted with reference to the position of a satellite terminal 150 to be installed, including such adjustments as distance weighting, spatial filtering, and the like, which may improve the correlation of various effects on signal quality to the particular position of the satellite terminal 150 to be installed. Thus, when a satellite terminal 150 is to be installed for communications with a satellite terminal 150, the signal quality criteria (e.g., signal quality threshold) for indicating a successful installation may take measurements from already-installed satellite terminals 150 into account.

In some examples the collected information associating measured characteristics of transmissions between a communications satellite 121 and a number of satellite terminals 150, along with the respective positions of each of the number of satellite terminals 150, may be used in determining a signal quality map as previously described. The determined signal quality map may provide a reference, for example, to which a signal quality measurement of an installation procedure transmission between a communications satellite 121 and the satellite terminal 150 being installed may be compared. A generated signal quality map need not be limited only to positions associated with installed satellite terminals 150, and may employ various methods to fill in data between positions of satellite terminals 150 (e.g., interpolation, distance-weighted averaging, spatial filtering, etc.).

In some examples a signal quality map may be based at least in part on one or more predetermined values, which may include such parameters as transmission power at a communications satellite 121 or a satellite terminal 150, distance between the communications satellite 121-*a* and various areas of an associated service beam coverage area (which may be based at a reference plane/surface such as sea level or an average elevation of the service beam coverage area 126, and/or adjusted for ground elevation changes due to geologic features, buildings, etc.), signal quality characteristics associated with portions of a service beam 125 (e.g., characteristics depending on an angular separation from an antenna boresight), antenna gain for an antenna at a communications satellite 121 or a satellite terminal 150, and the like. In some examples a signal quality map may be based entirely on predetermined values, and may represent a forward link signal quality threshold or a return link signal quality threshold, and one or more signal quality maps may be constructed to represent any combination thereof (e.g., a forward link signal quality map and a return link signal quality map for a service beam of a communications satellite 121, a signal quality map that associates an average of a return link and a forward link measurement, etc.).

In some examples a predetermined value may include an adjustment for known sources of environmental effects that may reduce signal quality, such as an urban region or the source of a known interferer. In some examples a signal quality map may begin with one or more values determined entirely on predetermined characteristics, and may be subsequently adjusted over time based on measured signal quality characteristics that are collected over time. In examples where a signal quality threshold for determining the success or failure of an installation procedure is not determined based on a map, a calculation may be performed that starts with one or more predetermined values, and is then adjusted based on measured signal quality information related to transmissions between the communications satellite 121-*a* and one or more satellite terminals where appropriate (e.g., when data from nearby installed satellite terminals 150 is available, and/or when data was collected recently to the installation procedure, etc.). In other examples, a signal quality map may be constructed entirely based on measured values, whether related to forward link signal quality, return link signal quality, or any combination thereof.

Figure 4:
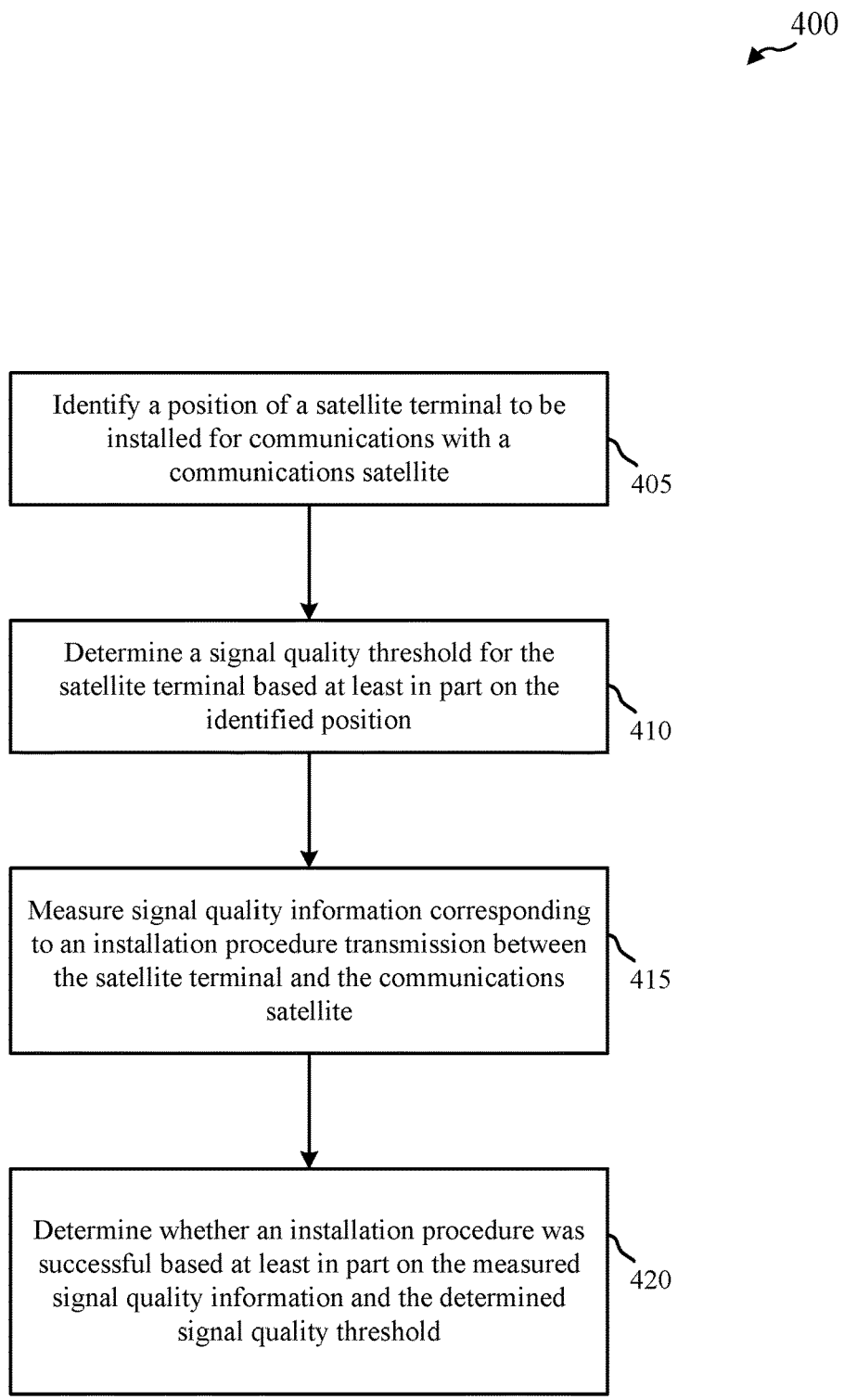
FIGS. 4 through 6 show flowcharts illustrating exemplary methods for dynamic signal quality thresholds for satellite terminal installations, in accordance with aspects of the present disclosure.

FIG. 4 shows a flowchart illustrating an exemplary method 400 for dynamic signal quality thresholds for satellite terminal installations, in accordance with aspects of the present disclosure. The steps of the exemplary method 400 may be performed by various devices of a satellite communications system, for example one or more of a satellite terminal 150, a CPE 160, a communications satellite 121, a gateway 130, and/or a network device 141 of a satellite communications system, as described with reference to FIGS. 1 through 3. A satellite terminal 150 associated with an installation procedure of the exemplary method 400 may be configured for communications with a communications satellite 121.

At step 405, the exemplary method 400 may include identifying a position of a satellite terminal 150 to be installed for communications with a communications satellite 121. In some examples the satellite terminal 150 being installed may be configured to receive positioning signals 115 via the satellite terminal auxiliary antenna 151 as described with reference to FIGS. 1 and 2. In such examples, the position of the satellite terminal may be determined based at least in part on the received positioning signals 115. The determined position may be used by the satellite terminal 150 for subsequent steps of the exemplary method 400, and/or may be transmitted to another device (e.g., a CPE 160, the communications satellite 121, a gateway 130, and/or a network device 141) via a wired or wireless communications message. In other examples, the position of the satellite terminal 150 may be determined by another device, such as a CPE 160 in proximity with the satellite terminal 150. The position determined by the CPE 160 may be used by the CPE 160 for subsequent steps of the exemplary method 400, and/or may be transmitted to another device (e.g., the satellite terminal 150, the communications satellite 121, a gateway 130, and/or a network device 141). In other examples, the position of the satellite terminal 150 may be identified using other techniques (e.g., an address, a ZIP code, a ZIP+4 code, etc.).

At step 410, the exemplary method 400 may include determining a signal quality threshold for the satellite terminal based at least in part on the identified position. As described with reference to FIG. 3, the determined signal quality threshold may be based on predetermined values and/or values based on measurements of transmissions between the communications satellite 121 and other previously-installed satellite terminals 150. In some examples the signal quality threshold may be determined from a signal quality map, from which a threshold is determined based on the identified position of the satellite terminal 150 being installed. In various examples, the determination of the signal quality threshold may be made by any one or more of the satellite terminal 150, the communications satellite 121, a CPE 160, a gateway 130, or a network device 141.

At step 415, the exemplary method 400 may include measuring signal quality information corresponding to an installation procedure transmission between the satellite terminal 150 and the communications satellite 121. In various examples, the measuring of the signal quality information may be made by any one or more of the satellite terminal 150, the communications satellite 121, a CPE 160, a gateway 130, or a network device 141. For example, when the installation procedure transmission is a transmission from the communications satellite that is received at the satellite terminal 150 (e.g., a forward link signal), the satellite terminal 150 may perform a measurement of the signal quality (e.g., signal strength, SNR, etc.). In some examples the signal received by the satellite terminal 150 may be forwarded by the satellite terminal 150 to a CPE 160, and the CPE 160 may subsequently perform a signal quality measurement. In another example, when the installation procedure transmission is a transmission from the satellite terminal 150 that is received at the communications satellite 121 (e.g., a return link signal), the communications satellite 121 may perform a measurement of the signal quality. In some examples the signal received by the communications satellite 121 may be forwarded by the communications satellite to a gateway 130 and/or a network device 141 which subsequently performs a signal quality measurement. The results of a signal quality measurement may be forwarded to various devices of the satellite communications system, such as being forwarded in a command message or other control signaling between devices of the satellite communications system (e.g., forwarded to the satellite terminal 150 in a command message).

At step 420, the exemplary method 400 may include determining whether an installation procedure was successful based at least in part on the measured signal quality information and the determined signal quality threshold. For example, the success of the installation procedure may be determined based on a comparison between the measured signal quality information and the determined signal quality threshold. In various examples, the determination of whether the installation procedure was successful may be made by any one or more of the satellite terminal 150, the communications satellite 121, a CPE 160, a gateway 130, or a network device 141, where the device performing step 420 may have performed steps to measure the signal quality information and determined the signal quality threshold (e.g., performed step 410 and/or step 415), or have otherwise received one or both of the signal quality threshold or the measured signal quality information.

Upon determining the success or failure of the installation procedure, an indication may be provided by the device performing the determination either directly to a user, or forwarded on to another device of the satellite communications system. Based on a determination that an installation procedure was successful, an installer may, for example, complete the installation of the satellite terminal 150. If the installation procedure was instead determined to be unsuccessful, an installer may perform additional steps to improve the signal quality associated with communications between the satellite terminal 150 and the communications satellite 121, such as adjusting the alignment of a satellite terminal antenna assembly 153, increasing a transmission power of the satellite terminal 150, etc. Thus, the exemplary method 400 can provide for the determination, and application of a dynamic signal quality criteria for installing a satellite terminal 150, where an installation procedure is determined to be successful or unsuccessful based on a position-specific signal quality criteria for the satellite terminal 150.

Figure 5:
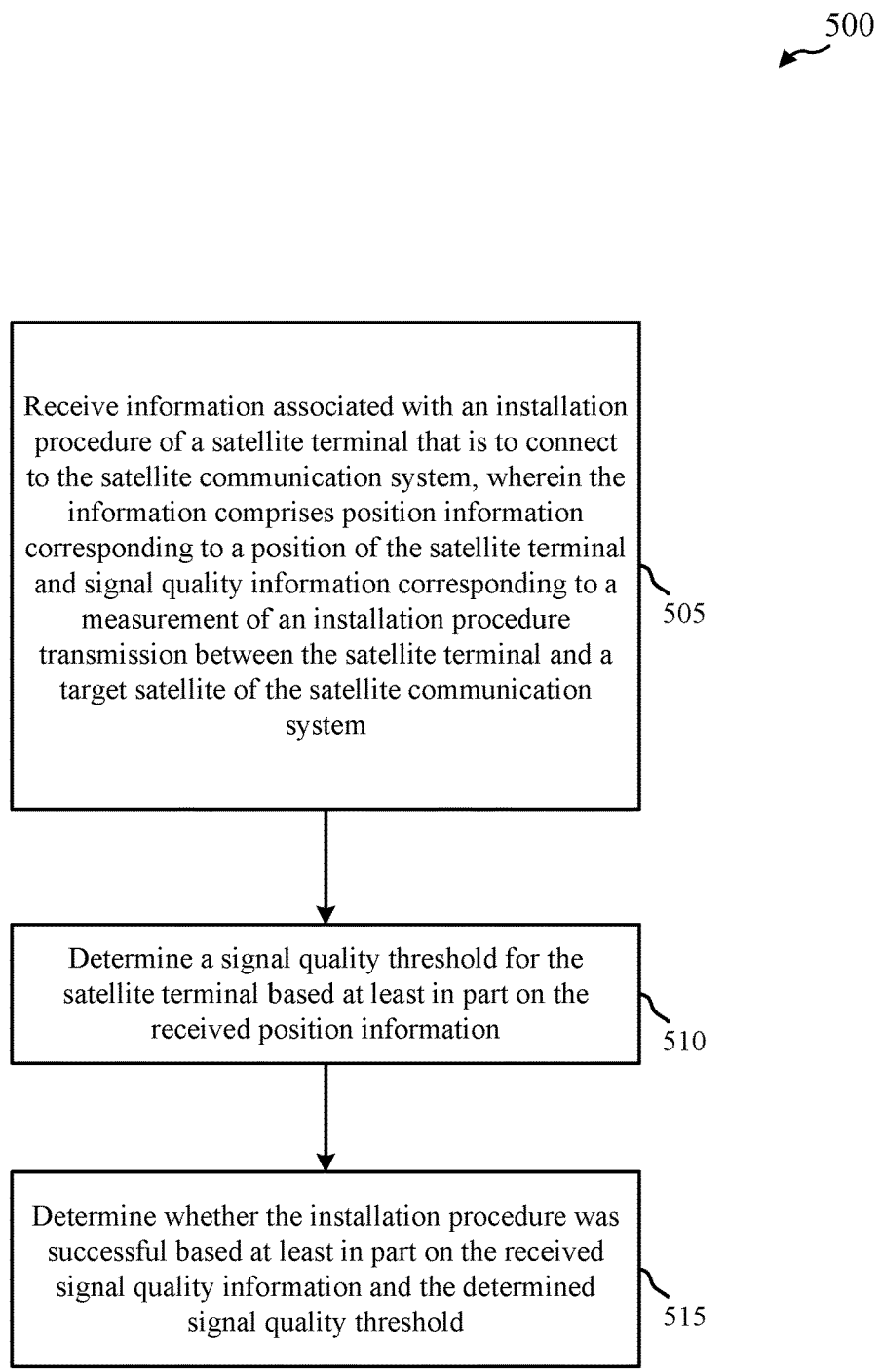

FIG. 5 shows a flowchart illustrating an exemplary method 500 for dynamic signal quality thresholds for satellite terminal installations, in accordance with aspects of the present disclosure. The steps of the exemplary method 500 may be performed by various devices of a satellite communications system, for example one or more of a satellite terminal 150, a CPE 160, a communications satellite 121, a gateway 130, and/or a network device 141 of a satellite communications system, as described with reference to FIGS. 1 through 3. A satellite terminal 150 associated with installation procedure referenced in the exemplary method 500 may be configured for communications with a communications satellite 121.

At step 505, the exemplary method 500 may include receiving information associated with an installation procedure of a satellite terminal 150 that is to connect to the satellite communications system. The information may include position information corresponding to a position of the satellite terminal 150 and signal quality information corresponding to a measurement of an installation procedure transmission between the satellite terminal 150 and a target communications satellite 121 of the satellite communications system. In various examples, the information corresponding to the position of the satellite terminal 150 may be based on positioning signals received at a satellite terminal 150 or an installation device such as a CPE 160, or the information corresponding to the position of the satellite terminal 150 may be otherwise determined (e.g., subscriber address, ZIP code, ZIP+4 code, etc.). The installation procedure transmission between the satellite terminal 150 and the communications satellite 121 may refer to a forward link transmission or a return link transmission, and thus the measurement of the installation procedure transmission may occur at any of a satellite terminal 150, a CPE 160, the communications satellite 121, a gateway 130, and/or a network device 141. The position information and/or the signal quality information may be subsequently used by the device that determined the information, or may be forwarded on to another device of the satellite communications system. Thus, receiving information associated with an installation procedure of a satellite terminal 150 at step 505 may occur at any one or more of the satellite terminal 150, the communications satellite 121, a CPE 160, a gateway 130, or a network device 141.

At step 510, the exemplary method 500 may include determining a signal quality threshold for the satellite terminal based at least in part on the received position information. In various examples, the determining of a signal quality threshold may be made by any one or more of the satellite terminal 150, the communications satellite 121, a CPE 160, a gateway 130, or a network device 141. For example, any of the devices of a satellite communications system may include formulas and/or parameters for determining the signal quality threshold based on the received position information. As previously described, in some examples the determination of a signal quality threshold may be based on associating the received position information with a position or area of a signal quality map. In various examples, the determined signal quality threshold may be used by the same device that made the determination, or the determined signal quality threshold may be forwarded on to another device of the satellite communications system.

At step 515, the exemplary method 500 may include determining whether the installation procedure was successful based at least in part on the received signal quality information and the determined signal quality threshold. In various examples, the determination of whether the installation procedure was successful may be made by any of the satellite terminal 150, the communications satellite 121, a CPE 160, a gateway 130, or a network device 141. For example, any of the described devices may include components that identify whether the received signal quality information is above or below the determined threshold.

Upon determining the success or failure of the installation procedure, an indication may be provided by the device performing the determination either directly to a user, or forwarded on to another device of the satellite communications system. Based on a determination that an installation procedure was successful, an installer may, for example, complete the installation of the satellite terminal 150. If the installation procedure was instead determined to be unsuccessful, an installer may perform additional steps to improve the signal quality associated with communications between the satellite terminal 150 and the communications satellite 121, such as adjusting the alignment of a satellite terminal antenna assembly 153, increasing a transmission power of the satellite terminal 150, etc. Thus, the exemplary method 500 can provide for the determination, and application of a dynamic signal quality criteria for installing a satellite terminal 150, where an installation procedure is determined to be successful or unsuccessful based on a position-specific signal quality criteria for the satellite terminal 150.

Figure 6:
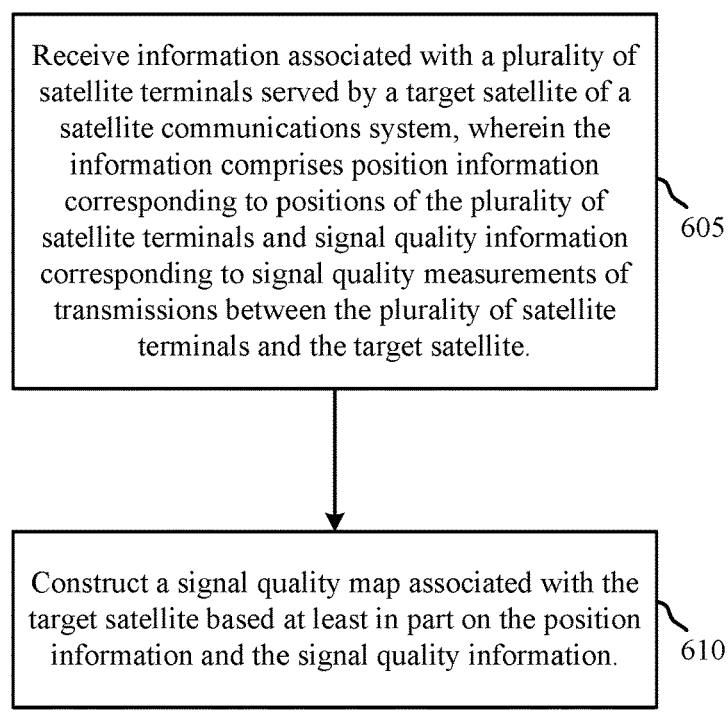

FIG. 6 shows a flowchart illustrating an exemplary method 600 for dynamic signal quality thresholds for satellite terminal installations, in accordance with aspects of the present disclosure. The steps of the exemplary method 600 may be performed by various devices of a satellite communications system, including a satellite terminal 150, a CPE 160, a communications satellite 121, a gateway 130, and/or a network device 141. The satellite terminals 150 associated with the exemplary method 600 may be configured for communications with a communications satellite 121, which may be an example of aspects of one or more communications satellite(s) 121 of a satellite communications system, as described with reference to FIGS. 1 through 3.

At step 605, the exemplary method 600 may include receiving information associated with a plurality of satellite terminals served by a target satellite of a satellite communications system. The information may include position information corresponding to positions of the plurality of satellite terminals and signal quality information corresponding to signal quality measurements of transmissions between the plurality of satellite terminals and the target satellite. In various examples, the information corresponding to the position of the satellite terminal 150 may be based on positioning signals received at a satellite terminal 150 or an installation device such as a CPE 160, or the information corresponding to the position of the satellite terminal 150 may be otherwise determined (e.g., subscriber address, ZIP code, ZIP+4 code, etc.). The transmission between the satellite terminal 150 and the communications satellite 121 may refer to a forward link transmission or a return link transmission, and thus the measurement of the transmission may occur at any of a satellite terminal 150, a CPE 160, the communications satellite 121, a gateway 130, and/or a network device 141. The measured transmissions associated with the received signal quality information may be installation procedure transmissions, or may be any other type of forward link or return link signals (e.g., communications signals, control signals, diagnostic signals, etc.). The position information and/or the signal quality information may be subsequently used by the device that determined the information, or may be forwarded on to another device of the satellite communications system. Thus, receiving information associated with a plurality of satellite terminals 150 at step 605 may occur at any one or more of the satellite terminal 150, the communications satellite 121, a CPE 160, a gateway 130, or a network device 141 as described with reference to FIGS. 1 through 3.

At step 610, the exemplary method 600 may include constructing a signal quality map associated with the target satellite based at least in part on the position information and the signal quality information. In various examples, the construction of a signal quality map may be made by any one or more of the satellite terminal 150, the communications satellite 121, a CPE 160, a gateway 130, or a network device 141 as described with reference to FIGS. 1 through 3. For example any of the described devices of a satellite communications system may include algorithms and processing abilities to construct a signal quality map as previously described by employing the received signal quality information and the received position information. The device that performs the construction of a signal quality map at step 610 may also receive and/or store other information related to a signal quality map, such as predetermined transmission characteristics, predetermined attenuation effects, predetermined sources of interference, and the like. In some examples the device that performs the construction of a signal quality map at step 610 may also identify sources of attenuation and/or noise, and/or identify a time constant associated with the source of such effects (e.g., a transient effect such as a storm, a semi-static effect such as an effect from vegetation, etc.). Thus, by various techniques and employing various devices and combinations thereof, a signal quality map may be constructed based on received information associated with a plurality of satellite terminals 150 of a satellite communications system. In various examples the constructed signal quality map may be stored in memory at the device that constructed the signal quality map, and/or the signal quality map maybe forwarded to other devices of the satellite communications system. In various examples a device that stores the signal quality map may provide a signal quality threshold for a subsequent installation procedure for a satellite terminal 150 to initiate communications with a communications satellite 121, including determining a signal quality threshold based on a received signal having position information associated with the satellite terminal 150 being installed.

Thus, exemplary methods 400, 500, and 600 provide methods for providing and employing dynamic signal quality criteria for satellite terminal installations. It should be noted that exemplary methods 400, 500, and 600 describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the present disclosure may be implemented in various combinations to provide various methods for dynamic signal quality criteria for the installation of a satellite terminal to communicate with a communications satellite.

Figure 7:
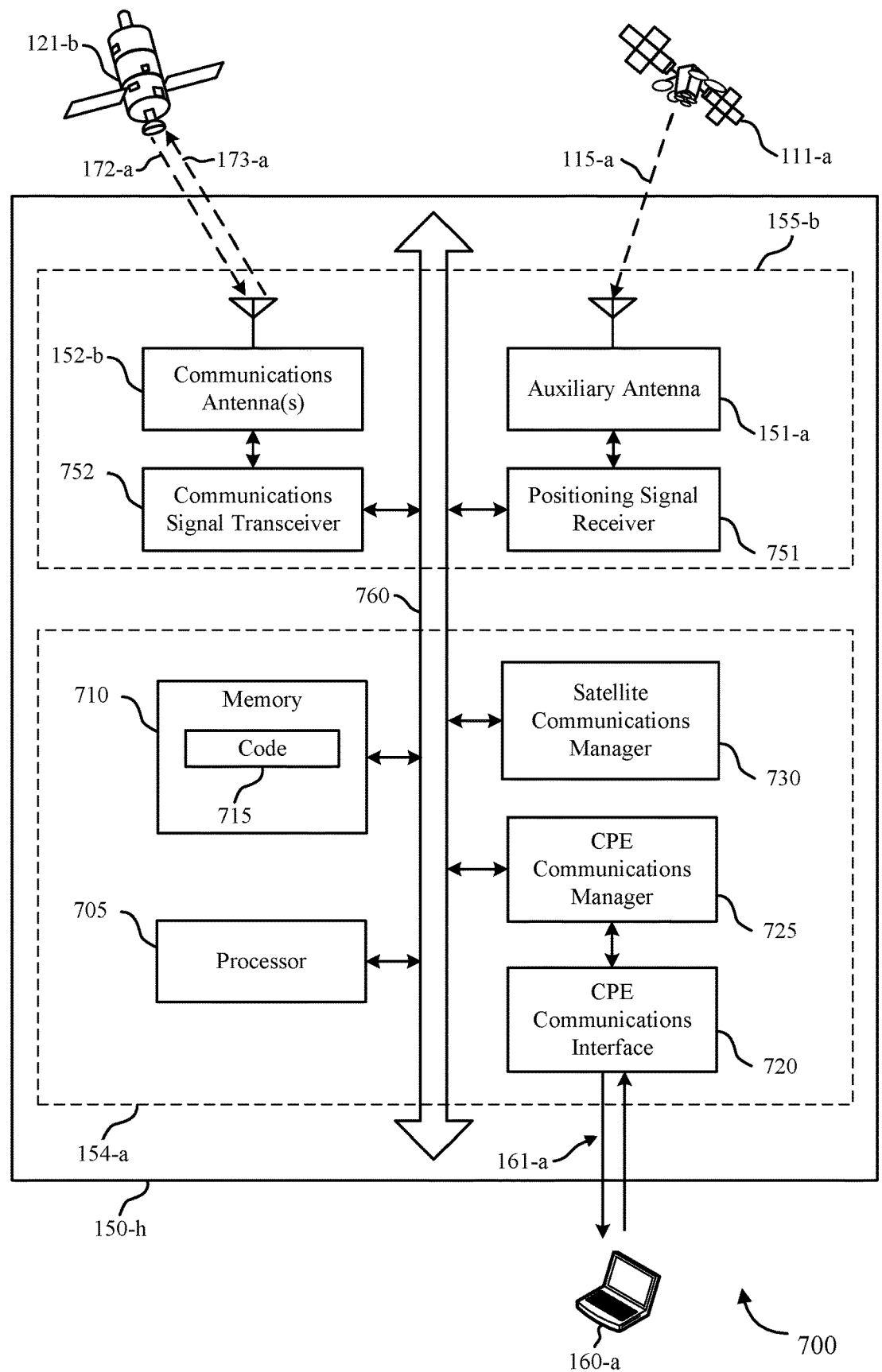
FIG. 7 shows a block diagram illustrating a satellite communications environment, in accordance with aspects of the present disclosure.

FIG. 7 shows a block diagram illustrating a satellite communications environment 700, in accordance with aspects of the present disclosure. The satellite communications environment 700 may be an example of the satellite communications environment 100 described with reference to FIG. 1. The satellite communications environment 700 includes a satellite terminal 150-*h*, which may be an example aspects of satellite terminals 150 described with reference to FIGS. 1 through 3. The satellite terminal 150-*h* may include a processor 705, and memory 710. The memory 710 may store computer-readable, computer-executable software or firmware code 715 including instructions that, when executed by the processor, cause the satellite terminal 150-*h* to perform various functions described herein (e.g., receiving positioning signals, sending and/or receiving installation procedure transmissions, determining a position-based signal quality threshold, etc.). In some examples, the code 715 may not be directly executable by the processor but may cause a computer (e.g., when compiled and executed) to perform functions described herein. The processor 705 may include an intelligent hardware device, (e.g., a central processing unit (CPU), a microcontroller, an application-specific integrated circuit (ASIC), etc.). Each of the components of the satellite terminal 150-*h* may communicate, directly or indirectly, with one another (e.g., via one or more buses 760).

The satellite terminal 150-*h* may be configured to communicate with one or more communications satellites (e.g., communications satellite 121-*b*), which may be an example of aspects of a communications satellite 121 of a satellite communications system as described with reference to FIGS. 1 through 3. The satellite terminal 150-*h* may be configured to establish a communications link with the communications satellite 121-*b* employing a satellite terminal communications antenna 152-b and a communications signal transceiver 752. The communications link may support bi-directional communications via forward link signals 172-a and/or return link signals 173-a between the satellite terminal 150-h and the communications satellite 121-b.

The communications signal transceiver 752 may include various circuits and/or processors to support receiving, transmitting, converting, coding, and/or decoding of forward link signals 172-a and/or return link signals 173-a. For example, the communications signal transceiver 752 may include a modem to modulate the packets and provide the modulated packets to the satellite terminal communications antenna 152-b for transmission, and to demodulate packets received from the satellite terminal communications antenna 152-b. As illustrated in the present example, the satellite terminal 150-h includes a single satellite terminal communications antenna 152-a. However, in some cases the satellite terminal 150-h may have more than one satellite terminal communications antenna 152, which may be capable of concurrently transmitting or receiving multiple wireless transmissions and/or be configured to support various beamforming techniques.

In some examples the satellite terminal 150-h may be configured to receive positioning signals 115-a. The positioning signals 115-a may be received from one or more auxiliary satellites (e.g., auxiliary satellite 111-a), which may be an example of aspects of an auxiliary satellite 111 of an auxiliary satellite system as described with reference to FIGS. 1 and 2. In some examples the auxiliary satellite 111-a may be a GNSS satellite (e.g., a GPS satellite or a GLONASS satellite). Additionally or alternatively, positioning signals 115-a may be received from another source, such as a land-based system that transmits one or more positioning signals 115-a.

The satellite terminal 150-h may receive positioning signals 115-a via a satellite terminal auxiliary antenna 151-a and a positioning signal receiver 751. The positioning signal receiver 751 may include various circuits and/or processors to support receiving, converting, and/or decoding of positioning signals 115-a. For example, the positioning signal receiver 751 may include a modem to demodulate packets received from the satellite terminal auxiliary antenna 151-a via positioning signals 115-a. In some examples the positioning signal receiver 751 may include circuits and/or processors configured to determine a position of the satellite terminal 150-h based on the received positioning signals 115-a, and/or associate positioning signals 115-a with a position of the auxiliary satellite 111-a when respective positioning signals 115-a are transmitted.

The satellite terminal 150-h may be configured to support communications with one or more CPEs (e.g., CPE 160-a) via signals transmitted over wired and/or wireless connection(s) 161-a. The satellite terminal 150-h may employ a CPE communications interface 720 supporting any number of wired and/or wireless links between the satellite terminal 150-h and the one or more CPEs 160, which may be managed by a CPE communications manager 725. As illustrated by the present example, the CPE communications manager 725 may implemented as a separate module of the satellite terminal 150-h, which may be configured as a standalone set of instructions (e.g., a software module having a set of instructions stored in memory, which may be a standalone portion of memory) and/or a separate processing element (e.g., a standalone central processing unit (CPU), microcontroller, application-specific integrated circuit (ASIC), field-programmable gate array (FPGA), or other like integrated circuit (IC)). In other examples, some or all of the operations of the CPE communications manager 725 may be caused by instructions stored in the memory 710 (e.g., a portion of the code 715), which in some examples may be performed by the processor 705.

The satellite terminal 150-h may include a satellite communications manager 730, configured to manage various aspects of communications between the satellite terminal 150-h and each of the communications satellite 121-b and the auxiliary satellite 111-a. The satellite communications manager 730 may control and/or configure various components of the satellite terminal perform the one or more operations of the exemplary methods 400, 500, or 600 described with reference to FIGS. 4, 5, and 6. For example, the satellite communications manager 730 may manage aspects of the operation of the satellite terminal 150-h to receive the positioning signals 115-a and determine a position of the satellite terminal 150-h based on the received positioning signals 115-a. For examples where an installation procedure transmission for the satellite terminal 150-h is a forward link signal 172-a, the satellite communications manager 730 may manage aspects of measuring signal quality information associated with the installation procedure transmission, and in some cases may additionally manage forwarding signal quality information and/or position information. In some examples the satellite communications manager 730 may also manage aspects of determining a position-specific signal quality threshold for the installation of the satellite terminal 150-h, and/or determining whether an installation procedure of the satellite terminal 150-h was successful. In another example, the satellite communications manager 730 may manage aspects of the operation of the satellite terminal 150-h to determine a signal quality map associated with transmissions between the communications satellite 121-b and a plurality of satellite terminals 150.

As illustrated by the present example, the satellite communications manager 730 may implemented as a separate module of the satellite terminal 150-h, which may be configured as a standalone set of instructions (e.g., a software module having a set of instructions stored in a standalone portion of memory) and/or a separate processing element (e.g., a standalone CPU, microcontroller, ASIC, FPGA, or like IC). In other examples, some or all of the operations of the satellite communications manager 730 may be caused by instructions stored in the memory 710 (e.g., a portion of the code 715), which in some examples may include steps performed by the processor 705.

In various examples, the components of the satellite terminal 150-h may be divided into subassemblies, where various components may be included in a subassembly either in part, or in its entirety. For example, the satellite terminal 150-h may include a satellite terminal subassembly 153-b and a satellite terminal receiver 158-a, which may be referred to as an ODU and an IDU respectively. The satellite terminal antenna assembly 153-b may include the communications antenna(s) 152-b, the communications signal transceiver 752, the satellite terminal auxiliary antenna 151-a, and the positioning signal receiver 751, along with any additional circuitry, processing, and/or memory to support the functionality of the satellite terminal antenna assembly 153-b. The satellite terminal receiver 158-a may include the satellite communications manager 730, the CPE communications manager 725, the CPE communications interface 720, processor 705, and memory 710, along with any additional circuitry, processing, and/or memory to support the functionality of the satellite terminal receiver 158-a. The satellite terminal antenna assembly 153-b may communicate with the satellite terminal receiver 158-*a* via a bus 960, which in various examples may support wired and/or wireless communications. Although the components of the satellite terminal 150-*h* are shown as being distributed between two subassemblies (e.g., the satellite terminal antenna assembly 153-*b* and the satellite terminal receiver 158-*a*), the components of a satellite terminal 150, or their respective functionality, may be distributed into any number of subassemblies, or may be a single integrated assembly.

Figure 8:
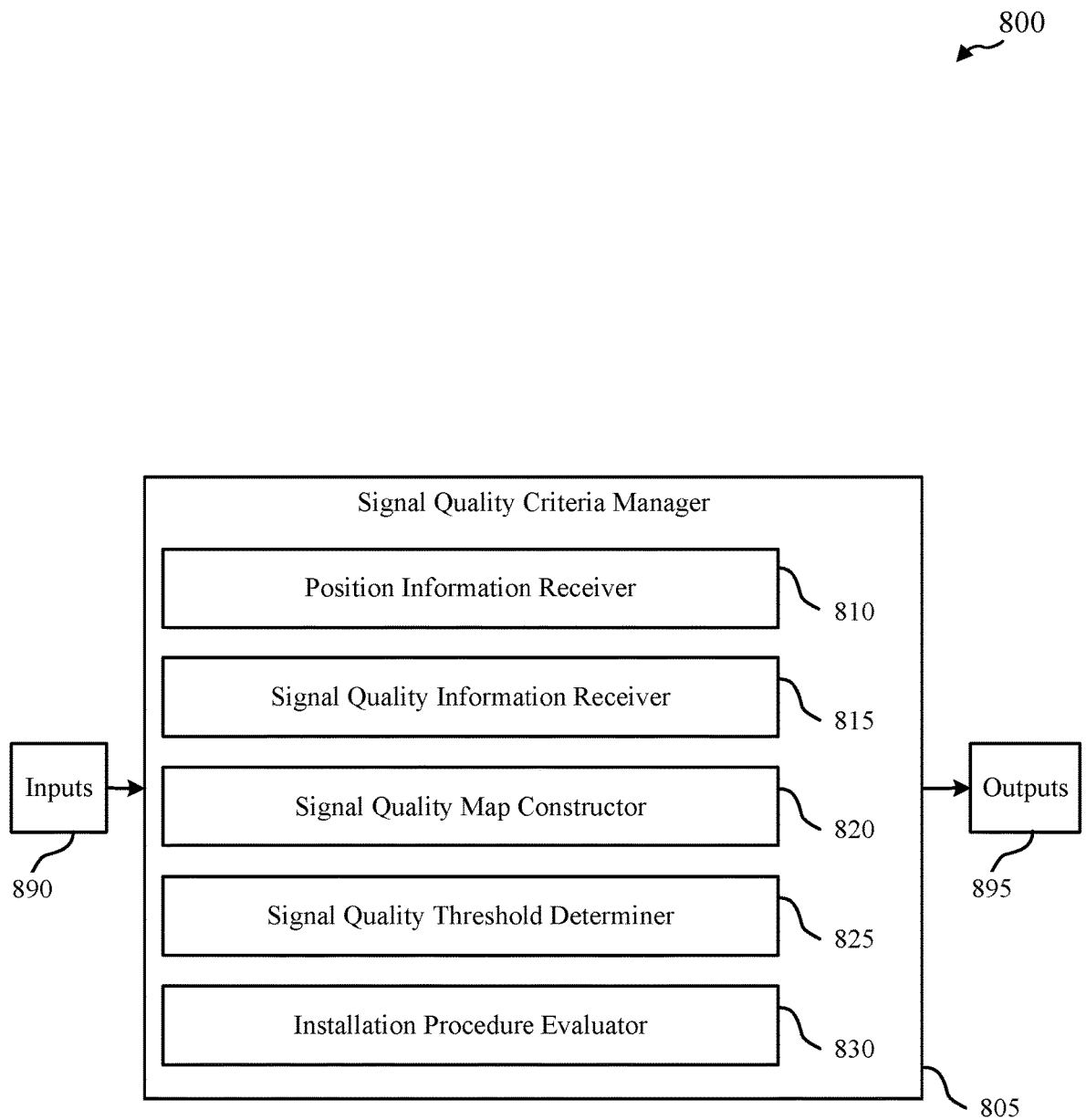
FIG. 8 shows a block diagram of a signal quality criteria manager, in accordance with aspects of the present disclosure.

FIG. 8 shows a block diagram 800 of a signal quality criteria manager 805, in accordance with aspects of the present disclosure. The signal quality criteria manager 805 may be a portion of any of a satellite terminal 150, a CPE 160, a communications satellite 121, a gateway 130, or a network device 141 as described with reference to FIGS. 1 through 3. For example, the signal quality criteria manager 805 may be a portion of a satellite terminal 150, operating with a shared processor and memory of the satellite terminal 150. In another example the signal quality criteria manager 805 may be a standalone component of a satellite terminal 150, receiving inputs from and sending outputs to other components of the satellite terminal 150. In other examples, the signal quality criteria manager 805 may be or form a portion of a CPE 160, a communications satellite 121, a gateway 130, or a network device 141 which manages signal quality criteria of one or more satellite terminals 150 to a satellite communications system, which may include determining a signal quality map and/or determining if an installation procedure was successful for a satellite terminal 150 by comparing signal quality information to a determined threshold. The signal quality criteria manager 805 may also be or include a processor. Each of the components of the signal quality criteria manager 805 may be in communication with each other to provide the functions described herein. The signal quality criteria manager 805 may be configured to receive inputs 890, and deliver outputs 895 using various techniques, including wired or wireless communications, control interfaces, user interfaces, or the like.

The signal quality criteria manager 805 may include a position information receiver 810, which may perform one or more of the aspects receiving information corresponding to the position of a satellite terminal as described with reference to FIGS. 1 through 7. For example, where the signal quality criteria manager 805 is a portion of a satellite terminal 150, the position information receiver 810 may receive, as inputs 890, one or more positioning signals 115 via a satellite terminal auxiliary antenna 151. In various examples the one or more positioning signals 115 may be received from a variety of land, air, or orbiting devices. In some examples the one or more positioning signals 115 may be received as inputs 890 from an auxiliary satellite 111, such as a GNSS satellite. In examples where the signal quality criteria manager 805 is a portion of a CPE 160, a communications satellite 121, a gateway 130, or a network device 141, the position information receiver 810 may receive position information via inputs 890 as signals forwarded from another device that has determined a position for a satellite terminal 150 via positioning signals 115, or receive signals including otherwise determined position information (e.g., as a user input of address, ZIP code, ZIP+4 code, etc.).

The signal quality criteria manager 805 may include a signal quality information receiver 815, which may perform one or more of the aspects of receiving measured signal quality information associated with transmissions between a satellite terminal 150 and a communications satellite 121, as described with reference to FIGS. 1 through 7. For example, where the signal quality criteria manager 805 is a portion of a satellite terminal 150, the signal quality information receiver 815 may receive, via inputs 890, a forward link signal 172 from a communications satellite 121, and perform a measurement of signal quality (e.g., signal strength, SNR, etc.). In some examples, a satellite terminal 150 may transmit a signal (e.g., a return link signal 173) which is subsequently measured by another device of a satellite communications system such as a communications satellite 121, a gateway 130, or a network device 141. Information associated with a measurement of the return link signal 173 transmitted by the satellite terminal 150 may then be forwarded to various devices of the satellite communications system, such as the satellite terminal 150. Thus, a signal quality information receiver 815 located at a satellite terminal 150 may also receive signal quality information associated with transmissions of the satellite terminal 150 via inputs 890. In various other examples, a signal quality criteria manager 805 may be located in another device of a satellite communications system (e.g., a CPE 160, a communications satellite 121, a gateway 130, a network device 141, etc.) and a signal quality information receiver 815 may receive transmissions that are measured to provide a signal quality measurement, and/or receive signal quality information associated with a transmission that was measured by another device of the satellite communications system.

The signal quality criteria manager 805 may include a signal quality map constructor 820, which may perform one or more of the aspects of constructing a signal quality map, as described with reference to FIGS. 1 through 7. For example, where the signal quality criteria manager 805 is a portion of any of a satellite terminal 150, a CPE 160, a communications satellite 121, a gateway 130, or a network device 141, the signal quality map constructor 820, may map a signal quality characteristic (e.g., signal strength, SNR, etc.) associated with transmissions between a communications satellite 121 and various satellite terminals 150 with a position (e.g., a service beam coverage area 126). In some examples the signal quality map constructor 820 may construct the signal quality map based on predetermined parameters (e.g., transmission strength, antenna gain, distance between a communications satellite 121 and various portions of a service beam coverage area 126, known sources of signal attenuation, known sources of interference, etc.). The predetermined parameters may be, for example, stored in the memory of a device containing the signal quality criteria manager 805, and/or transmitted between various devices of a satellite communications system and received at the signal quality map constructor 820 via inputs 890.

In some examples the signal quality map constructor 820 may receive information associated with a plurality of satellite terminals 150 served by a communications satellite 121, where the received information includes position information for each of the satellite terminals 150 (e.g., position information corresponding to a plurality of satellite terminals 150 received at the position information receiver 810) and signal quality information for each of the satellite terminals 150 (e.g., signal quality information corresponding to a plurality of satellite terminals 150 received at the signal quality information receiver 815). The received information may be used to adjust a map constructed from predetermined information, and/or to construct a map based entirely on measured transmissions. Signal quality maps constructed by the signal quality map constructor 820 may reflect signal quality of forward link transmissions, reverse link transmissions, or any combination thereof. Furthermore, signal quality maps constructed by the signal quality map constructor 820 may be stored in memory at various devices of the satellite communications system, and/or transmitted between devices of the satellite communications system (e.g., forwarded to another device of a satellite communications system via outputs 895).

The signal quality criteria manager 805 may include a signal quality threshold determiner 825, which may perform one or more of the aspects of determining a signal quality threshold as described with reference to FIGS. 1 through 7. For example, where the signal quality criteria manager 805 is a portion of any of a satellite terminal 150, a CPE 160, a communications satellite 121, a gateway 130, or a network device 141, the signal quality threshold determiner 825 may determine a signal quality threshold based on a determined position for a satellite terminal 150 to be installed for communications with a communications satellite 121. The signal quality threshold may be determined based on a mathematical formula that includes predetermined parameters, measurements of signals between other satellite terminals 150 and the communications satellite 121, or any combination thereof. In some examples the signal quality threshold determiner may use a signal quality map, which in various examples may be determined by the signal quality map constructor 820, or may be a signal quality map received via inputs 890.

The signal quality criteria manager 805 may include an installation procedure evaluator 830, which may perform one or more of the aspects of evaluating an installation procedure for a satellite terminal 150 that is to establish communications with a communications satellite 121 as described with reference to FIGS. 1 through 7. For example, where the signal quality criteria manager 805 is a portion of any of a satellite terminal 150, a CPE 160, a communications satellite 121, a gateway 130, or a network device 141, the installation procedure evaluator 830 may determine whether an installation procedure for a satellite terminal to be installed for communications with a communications satellite 121 was successful or unsuccessful. The determination may be made by comparing signal quality information associated with an installation procedure transmission between the satellite terminal 150 and the communications satellite 121 and a signal quality threshold. The signal quality criteria manager 805 may communicate the result of a determination made by the installation procedure evaluator 830 by way of outputs 895, which may provide a visual and/or audible cue to an installer, and or may provide an indication to another device of the satellite communications system. Thus, the signal quality criteria manager may provide for position-specific signal quality criteria for the installation of a satellite terminal according to any of the methods described with reference to FIGS. 1 through 7.

The components of the signal quality criteria manager 805, individually or collectively, may be implemented with at least one ASIC adapted to perform some or all of the applicable features in hardware. Alternatively, the features may be performed by one or more other processing units (or cores), on at least one IC. In other examples, other types of integrated circuits may be used (e.g., Structured/Platform ASICs, a FPGA, or another semi-custom IC), which may be programmed in any manner known in the art. The features may also be implemented, in whole or in part, with instructions embodied in a memory, formatted to be executed by one or more general or application-specific processors.

Figure 9:
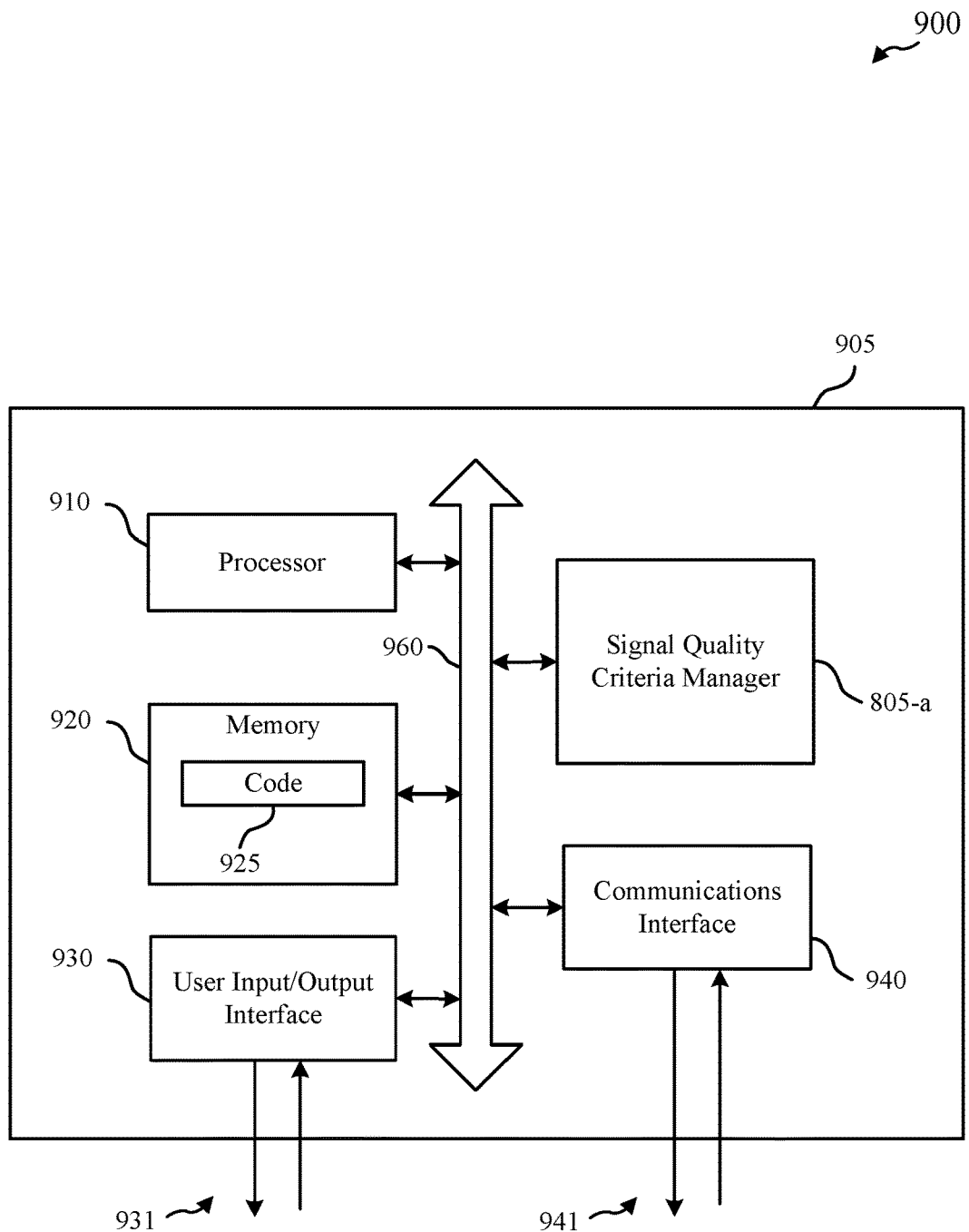
FIG. 9 illustrates a block diagram of an apparatus configured for dynamic signal quality criteria, in accordance with aspects of the present disclosure.

FIG. 9 illustrates a block diagram 900 of an apparatus 905 configured for dynamic signal quality criteria for the installation of a satellite terminal, in accordance with aspects of the present disclosure. The apparatus 905 may be any of a satellite terminal 150, a CPE 160, a gateway 130, or a network device 141 as described with reference to FIGS. 1 through 3. The apparatus 905 may include a processor 910, memory 920, a user input/output interface 930, and a communications interface 940. The apparatus 905 may also include a signal quality criteria manager 805-*a*, which may be an example of aspects of the signal quality criteria manager 805 described with reference to FIG. 8. Each of these modules may communicate, directly or indirectly, with one another (e.g., via one or more buses).

The memory 920 may include RAM and/or ROM. The memory 920 may store computer-readable, computer-executable software or firmware code 925 including instructions that, when executed by the processor, cause the apparatus 905 to perform various functions described herein (e.g., determining position-based access to a satellite communications system, etc.). In some cases, the code 925 may not be directly executable by the processor but may cause a computer (e.g., when compiled and executed) to perform functions described herein. The processor 910 may include an intelligent hardware device, (e.g., a CPU, a microcontroller, an ASIC, etc.)

The user input/output interface 930 may provide any suitable input and/or output functionality 931 to support the operation of the apparatus 905 by a user. For example, the user input/output interface 930 may provide buttons, a keyboard, a wired or wireless control interface, and the like to receive inputs from a user during the operation of the apparatus 905, or an interface to receive inputs from such devices and interfaces. The user input/output interface may also provide lights, LEDs, a screen, a speaker, a wired or wireless control interface, and the like for providing output to the user to indicate various functions of the apparatus 905 during operation, or an interface to provide outputs to such devices.

The communications interface 940 may provide bidirectional communications 941, via one or more antennas, wired links, or wireless links, with one or more networks, as described above. For example, the communications interface 940 may communicate bi-directionally with any one or more of a satellite (e.g., a communications satellite 121 and/or an auxiliary satellite 111), a satellite terminal 150, a CPE 160, a gateway 130, or a network device 141 as described with reference to FIGS. 1 through 3. The communications interface 940 may also include a modem to modulate the packets and provide the modulated packets to the antennas for transmission, and to demodulate packets received from the antennas.

As illustrated by the present example, the signal quality criteria manager 805-*a* may be implemented as a separate module of the apparatus 905, which may be configured as a standalone set of instructions (e.g., a software module having a set of instructions stored in a standalone portion of memory) and/or a separate processing element (e.g., a standalone CPU, microcontroller, IC, ASIC, FPGA module, or the like). In other examples, some or all of the operations of the signal quality criteria manager 805-*a* may be caused by instructions stored in the memory 920 (e.g., a portion of the code 925), which in some examples may be performed by the processor 910.

Although the descriptions above recite an auxiliary satellite system and a satellite communications system (e.g., the auxiliary satellite system and the satellite communications system described with reference to FIGS. 1 through 8), a particular satellite may be included in both the auxiliary satellite system and the satellite communications system. For example, a satellite terminal 150 may have established a communications link with a communications satellite 121, and also be receiving a positioning signal 115 from the communications satellite 121. In some examples the satellite terminal 150 may have established a communications link with a first communications satellite 121, and be receiving a positioning signal 115 from a second communications satellite 121 that is used to determine the position of the satellite terminal 150. For various reasons, the satellite terminal 150 may subsequently establish a communications link with the second satellite 121. Thus, the second satellite 121 may be part of an auxiliary satellite system in relation to determining the position of a satellite terminal 150, and part of a satellite communications system in relation to providing communications with the satellite terminal 150. In other words, at various times a satellite may perform the steps pertaining to either of an auxiliary satellite system or a satellite communications system.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for use in a satellite communication system, comprising:
    receiving position information corresponding to a position of a satellite terminal to be installed in the satellite communication system, the satellite terminal in a region of a first coverage area that overlaps with a second coverage area, wherein the first coverage area is associated with a first communications satellite, the second coverage area is associated with a second communications satellite, and the first communications satellite and the second communications satellite are in a same satellite communication system, the same satellite communication system being the satellite communication system;
initially pointing, based at least in part on the received position information, the satellite terminal at the first communications satellite;
determining a signal quality threshold for the satellite terminal based at least in part on whether the received position information for the satellite terminal is within the region and a signal quality map that includes the region;
adjusting the pointing of the satellite terminal based at least in part on the determined signal quality threshold;
determining that a signal quality value for the adjusted pointing satisfies the signal quality threshold; and
communicating, by the satellite terminal, with the first communications satellite and the second communications satellite.

2. The method of claim 1, wherein the signal quality map is based at least in part on transmissions from the first communications satellite and transmissions from the second communications satellite.

3. The method of claim 1, wherein the signal quality map is based at least in part on a signal quality parameter that depends on an angular separation from a boresight of the satellite terminal.

4. The method of claim 1, wherein the signal quality threshold for the satellite terminal in the region of the first coverage area is reduced compared to a signal quality threshold associated with satellite terminals in the first coverage area outside the region.

5. The method of claim 1, wherein adjusting the pointing of the satellite terminal further comprises:
receiving a forward link signal from one or more of the first communications satellite and the second communications satellite; and
measuring an indication of a signal strength of the received forward link signal, wherein the pointing of the satellite terminal is adjusted based at least in part on the measured indication of the signal strength and the determined signal quality threshold.

6. The method of claim 5, wherein adjusting the pointing of the satellite terminal further comprises:
adjusting the pointing of the satellite terminal to a maximum signal strength.

7. The method of claim 5, wherein the indication of the signal strength comprises one or more of the signal strength or a signal-to-noise ratio.

8. The method of claim 1, wherein the satellite terminal is configured for bi-directional communications with one or more of the first communications satellite or the second communications satellite.

9. The method of claim 8, wherein the satellite terminal is configured for bi-directional communications with the first communications satellite and bi-directional communications with the second communications satellite.

10. The method of claim 1, wherein the position information is received from one or more auxiliary satellites of an auxiliary satellite system different from the satellite communication system.

11. The method of claim 10, wherein the auxiliary satellite system comprises a global navigation satellite system.

12. The method of claim 1, wherein the signal quality threshold is different from a signal quality threshold in a second region of the first coverage area outside the region of the first coverage area that overlaps with the second coverage area.

13. A satellite communication system, comprising:
a first communications satellite having a first coverage area;
a second communications satellite having a second coverage area, wherein the first communications satellite and the second communications satellite are in a same satellite communication system, the same satellite communication system being the satellite communication system;
an installation device associated with a satellite terminal to be installed in the satellite communication system, the installation device configured to:
receive position information corresponding to a position of the satellite terminal,
initially point the satellite terminal at the first communications satellite based at least in part on the received position information,
determine a signal quality threshold for the satellite terminal based at least in part on whether the received position information for the satellite terminal is within a region of that satellite terminal comprising an overlapping portion of the first coverage area and the second coverage area and a signal quality map, the signal quality map including the region,
adjust the pointing of the satellite terminal based at least in part on the determined signal quality threshold, and
determine that a signal quality value for the adjusted pointing satisfies the signal quality threshold; and
the satellite terminal to be installed in the satellite communication system, the satellite terminal configured to communicate with the first communications satellite and the second communications satellite based at least in part on the determining that the signal quality threshold satisfies the signal quality threshold.

14. The satellite communication system of claim 13, wherein the signal quality map is based at least in part on transmissions from the first communications satellite and transmissions from the second communications satellite.

15. The satellite communication system of claim 13, wherein the signal quality map is based at least in part on a signal quality parameter that depends on an angular separation from a boresight of the satellite terminal.

16. The satellite communication system of claim 13, wherein the first communications satellite has a geostationary orbit and the second communications satellite has a low Earth orbit or a medium Earth orbit.

17. The satellite communication system of claim 13, wherein the first communications satellite has a first geostationary orbit and the second communications satellite has a second geostationary orbit.

18. The satellite communication system of claim 13, wherein the signal quality threshold is different from a signal quality threshold in a second region of the first coverage area outside the region of the first coverage area that overlaps with the second coverage area.

19. A satellite terminal, comprising:
a positioning signal receiver;
a communication signal transceiver;
a processor;
memory coupled with the processor; and
instructions stored in the memory and executable by the processor to cause the satellite terminal to:

receive, at the positioning signal receiver, position information corresponding to a position of the satellite terminal to be installed in a satellite communication system, the satellite terminal in a region of a first coverage area that overlaps with a second coverage area, wherein the first coverage area is associated with a first communications satellite, the second coverage area is associated with a second communications satellite, and the first communications satellite and the second communications satellite are in a same satellite communication system, the same satellite communication system being the satellite communication system into which the satellite terminal is to be installed, the satellite terminal initially pointed at the first communications satellite based at least in part on the received position information;

determine a signal quality threshold for the satellite terminal based at least in part on whether the received position information for the satellite terminal is within the region and a signal quality map that includes the region, the pointing of the satellite terminal adjusted based at least in part on the determined signal quality threshold;

determine that a signal quality value for the adjusted pointing satisfies the signal quality threshold; and communicate, using the communication signal transceiver, with the first communications satellite and the second communications satellite based at least in part on determining that the signal quality threshold for the adjusted pointing satisfies the signal quality threshold.

20. The satellite terminal of claim 19, wherein the satellite terminal is initially pointed at the first communications satellite based at least in part on the received position information.

21. The satellite terminal of claim 19, wherein the signal quality map is based at least in part on transmissions from the first communications satellite and transmissions from the second communications satellite.

22. The satellite terminal of claim 19, wherein the signal quality map is based at least in part on a signal quality parameter that depends on an angular separation from a boresight of the satellite terminal.

23. The satellite terminal of claim 19, wherein the satellite terminal is configured for bi-directional communications with one or more of the first communications satellite or the second communications satellite.

24. The satellite terminal of claim 23, wherein the satellite terminal is configured for bi-directional communications with the first communications satellite and bi-directional communications with the second communications satellite.

25. The satellite terminal of claim 19, wherein the signal quality threshold is different from a signal quality threshold in a second region of the first coverage area outside the region of the first coverage area that overlaps with the second coverage area.

\* \* \* \* \*